United States Patent [19]

Tada et al.

[11] Patent Number: 5,572,728
[45] Date of Patent: Nov. 5, 1996

[54] CONFERENCE MULTIMEDIA SUMMARY SUPPORT SYSTEM AND METHOD

[75] Inventors: Katsumi Tada, Yokohama; Itaru Mimura, Sayama; Mitsuru Ikezawa, Kodaira; Taizo Kinoshita, Tachikawa, all of Japan

[73] Assignee: Hitachi, Ltd., Tokyo, Japan

[21] Appl. No.: 363,820

[22] Filed: Dec. 27, 1994

[30] Foreign Application Priority Data

Dec. 24, 1993 [JP] Japan .................................. 5-326822

[51] Int. Cl.$^6$ .................................................. G06F 17/30
[52] U.S. Cl. .................... 395/616; 395/501; 364/DIG. 1; 364/282.1; 364/282.3; 364/283.1; 364/283.3
[58] Field of Search ..................................... 395/600, 154

[56] References Cited

U.S. PATENT DOCUMENTS

| | | | |
|---|---|---|---|
| 4,914,586 | 4/1990 | Swinehart et al. | 395/600 |
| 5,388,264 | 2/1995 | Tobias, II et al. | 395/650 |
| 5,420,801 | 5/1995 | Dockter et al. | 364/514 R |
| 5,428,730 | 6/1995 | Baker et al. | 395/154 |
| 5,432,940 | 7/1995 | Potts et al. | 395/700 |
| 5,434,910 | 7/1995 | Johnson et al. | 379/89 |

OTHER PUBLICATIONS

Yoneda et al, "A New Communication Tool: Time Dependent Multimedia Document", PROC of the 12th International Comference on Distributed Computing Systems, 9–12 Jun. 1992, pp. 90–97.

MacNeil, "Generating Multimedia Presentations Automatically using TYRO, the Constraint, Case–Based Designer's Apprentice", PROC 1991 IEEE Workshop on Visual Languages, 8–11 Oct. 1991, pp. 74–79.

Koegel et al, "Visual Programming Abstractions for Interactive Multimedia Presentation Authoring", PROC 1992 IEEE Workshop on Visual Languages, 15–18 Sep. 1992, pp. 231–233.

*Primary Examiner*—Wayne Amsbury
*Attorney, Agent, or Firm*—Fay, Sharpe, Beall, Fagan, Minnich & McKee

[57] ABSTRACT

A system and a user interface make it possible to easily edit important items of a program, such as a conference, in a short time using multimedia information.

A retrieving file is generated by extracting a keyword from multimedia information input through a dynamic image input unit such as a camera, a voice input unit such as a microphone, a handwritten character input unit, a pointing unit such as a mouse, and a key-input unit such as a keyboard. A report preparation supporting system and a user interface make it possible to easily edit a report in a short time by referring to the retrieving file and retrieving and editing a scene in which an important item appears when the report is prepared.

20 Claims, 27 Drawing Sheets

| PREPARER | TYPE OF MEDIUM | MEDIUM NUMBER | KEYWORD | APPEARANCE TIME |
|---|---|---|---|---|
| CHAIRMAN | VOICE | 1 | TODAY | 00:01 |
| CHAIRMAN | VOICE | 1 | ANNOUNCEMENT | 00:06 |
| CHAIRMAN | VOICE | 1 | NEW PRODUCT X | 00:08 |
| CHAIRMAN | VOICE | 1 | PRODUCT PLAN | 00:11 |
| A | VOICE | 2 | MATERIAL 1 | 00:21 |
| A | VOICE | 2 | PRODUCT | 00:25 |
| ... | ... | ... | ... | ... |
| A | VOICE | 2 | NEXT YEAR | 05:08 |
| A | VOICE | 2 | JUNE | 05:10 |
| A | VOICE | 2 | PRODUCT SHIPPING | 05:12 |
| B | VOICE | 3 | DEVELOPMENT | 05:21 |
| B | VOICE | 3 | SCHEDULE | 05:23 |
| A | VOICE | 2 | SATISFACTORILY | 05:31 |
| A | VOICE | 2 | CONTENTS | 05:38 |
| A | VOICE | 2 | TECHNICAL SUBJECT | 05:42 |
| A | VOICE | 2 | FUTURE | 05:45 |
| A | VOICE | 2 | TECHNOLOGY DEPARTMENT | 05:47 |
| ... | ... | ... | ... | ... |
| A | MARKER | 2 | DETERMINED | 15:28 |
| ... | ... | ... | ... | ... |

*FIG. 7*

| PREPARER | TYPE OF MEDIUM | MEDIUM NUMBER | START TIME | END TIME |
|---|---|---|---|---|
| CHAIRMAN | VOICE | 1 | 00:00 | 00:15 |
| A | VOICE | 2 | 00:17 | 05:16 |
| A | MATERIAL | 1 | 00:23 | 10:18 |
| B | VOICE | 3 | 05:18 | 05:27 |
| A | VOICE | 4 | 05:29 | 05:55 |
| ... | ... | ... | ... | ... |

*FIG. 9*

NON-IMAGE RELEVANT INFORMATION DISPLAY AREA

| DISCUSSION PARTICIPANT | | | |
|---|---|---|---|
| REFERENCE MATERIAL | | | |
| KEYWORD | | | |
| MOST-FREQUENT SPEAKER | | | |

| MATERIAL SELECTION SCREEN | | |
|---|---|---|
| MATERIAL NUMBER | TITLE | PREPARER |
| 1 | ✶✶✶✶ | |
| 2 | ———————— | |
| 3 | —————— | |
| 4 | #### | |
| | | |

NON-IMAGE RELEVANT INFORMATION DISPLAY AREA

| DISCUSSION PARTICIPANT | | | |
|---|---|---|---|
| KEYBOARD | | | |
| MOST-FREQUENT SPEAKER | | | |
| | | | |

5,572,728

CONFERENCE MULTIMEDIA SUMMARY SUPPORT SYSTEM AND METHOD

BACKGROUND OF THE INVENTION

1. Field of the Invention

The present invention relates to a multimedia system and method for supporting the preparation of a summary, and more particularly to a system and method for supporting the preparation of a summary of a proceeding or program, such as a conference, using multimedia information.

2. Description of the Related Art

To prepare a conference report or summary of the details of a conference, the following two methods have been employed: a method of preparing minutes and a method of recording audio and/or video using a tape recorder or camera, for example.

In the case of the former method, one of the conference participants serves as a recorder who prepares minutes in which the details of speeches in the conference are recorded individually. To prepare the conference report, the details of the conference are summarized by reviewing the minutes and selecting only important items.

In the case of the latter method, the details of a conference are recorded by a tape recorder or camera. Then, the details of the conference are summarized by reproducing scenes that include important items and editing out the less interesting details.

At least the following problems arise in preparing the minutes of a conference.

First, a recorder must have a special skill such as shorthand, and also must understand the details of the entire conference to know how to synthesize a multitude of information into a coherent summary of events. Second, it is difficult for the recorder to participate in the proceedings because he is dedicated to the preparation of the minutes. Third, when a presentation using materials or dynamic images is given during the conference, it is almost impossible to prepare the minutes to sufficiently show all details of the presentation.

The method of recording the details of a conference in a tape recorder or camera also has problems, as follows.

First, because the information recorded in a tape recorder or camera is not indexed for retrieval, the details of a conference must entirely be reproduced to prepare the conference report, so that the details alone of the conference can be reviewed and summarized. Second, when a recorder feels that an item is important, it is necessary to rapidly advance or rewind the tape to review and confirm the details of the item. Therefore, preparing a conference report requires a considerable amount of time.

SUMMARY OF THE INVENTION

It is an object of the present invention to provide a system and a user interface for easily editing important items of a proceeding or program in a short time, to produce a summary of the proceeding or program using multimedia information such as voices and images.

To solve the above problems and achieve the stated object and other objects and advantages of the invention, a summary preparation supporting system has been devised to include data storing means for storing input dynamic image data, static image data, voice data, handwritten character data, display data designated by a pointing means, and data input by a keyboard means. A retrieving file is generated by analyzing the time relation of the data stored in the data storing means, after which the generated retrieving file is stored, and the data are read from the data storing means by reference to the stored retrieving file to support the preparation of a summary or report by displaying and editing the data.

In a preferred embodiment, the invention is particularly directed to the preparation of a conference report of a conference or similar proceeding.

BRIEF DESCRIPTION OF THE DRAWINGS

FIG. 7 is an example of a keyword list;

FIG. 9 is an example of an event list;

DETAILED DESCRIPTION OF THE PREFERRED EMBODIMENTS

Before outlining the summary preparation supporting system of the present invention, an outline of summary preparation screens and the summary preparation procedure of the preparation supporting system of the present invention will be described below in accordance with specific examples directed to the preparation of a conference report. The preparation of a conference report is a particularly preferred application of the inventive teachings, but the invention, in its broad aspects, is not limited to conference report preparation, but may be applied in any field in which audio and/or visual information is synthesized to produce a summary of one or more proceedings or programs. Without limiting the invention, one or more sporting events, movies, news items, and speeches, are further examples of proceedings or programs that can be analyzed and synopsized to produce a summary or digest according to the teachings of the present invention.

Figure 2:
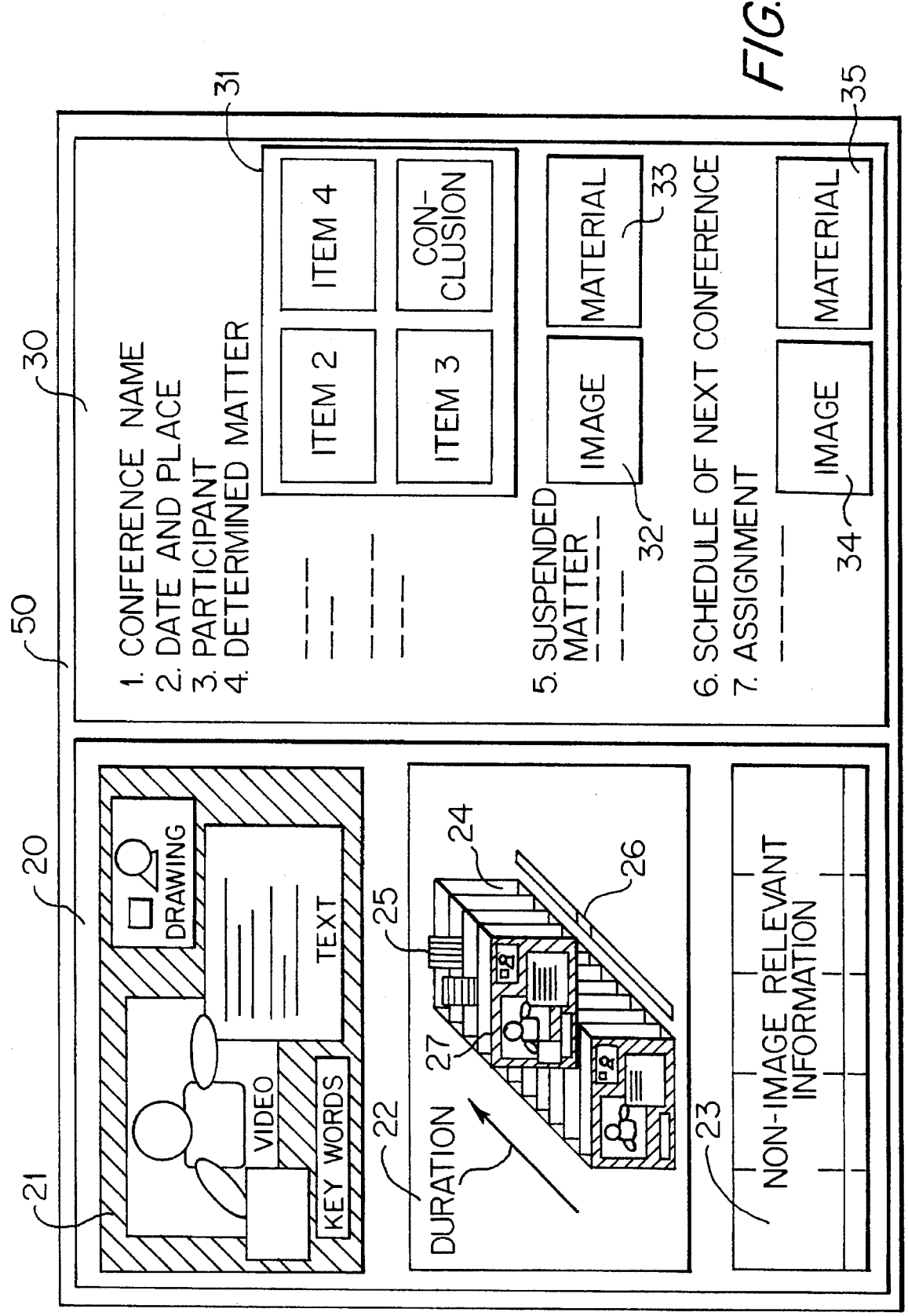
FIG. 2 is an illustration showing a conference report preparation screen.

FIG. 2 shows a conference report preparation screen 50, which comprises a retrieval and browsing area 20 and a digest area 30.

The retrieval and browsing 20 includes an enlarged image display area 21 for displaying an enlarged image videotaped or shown as an exhibit (material) during a conference, an image display area 22 for displaying a flow of images in an arrangement that corresponds to the passage of time of the conference by arranging conference images 24 along the vertical (perspective) axis like slides, and a non-image information display area 23 for displaying conference information other than the images.

First, in the image display area 22, a slider 26 is provided beside a particular image 27 of the conference images 24, whereby the image 27 corresponds to the position of the slider 26 (for example, visually opposite the slider in the display) and can be displayed at the forefront of the image group. The slider 26 is portrayed in a groove shown in the display of the disclosed embodiment, and, in the groove at the position of the slider 26, a shade of color is displayed according to the significance of the corresponding image 27. For example, an image with great significance is colored dark and a scene with little significance is colored lightly. Moreover, tags 25 are attached to the tops of certain images 24 that correspond to items that are considered important to the preparation of a conference report, such as the name, place, date, or participants of the conference, determined or resolved matters, suspended matters, the schedule for the next conference, and the subject to be studied at the next conference.

Second, in the enlarged image display area 21, it is possible to display an enlarged image designated by the conference report preparer so that the image can easily be viewed by the preparer. That is, it is possible to display an enlarged image 27 selected in the image display area 22, or to selectively output only a medium designated by the preparer from the image 27 as necessary. Finally, in the non-image relevant information display area 23, a list of relevant information which cannot be displayed by an image volume (such as discussion participants, reference material numbers, keywords included in the speeches, or the identity of most-frequent speaking participant) is displayed.

In the digest area 30, a conference report preparation template, including items necessary for the preparation of the conference report, is displayed. Moreover, it is possible to open a window for displaying an image in one of the areas corresponding to the items and copy the item selected in the retrieval and browsing 20.

Figure 3:
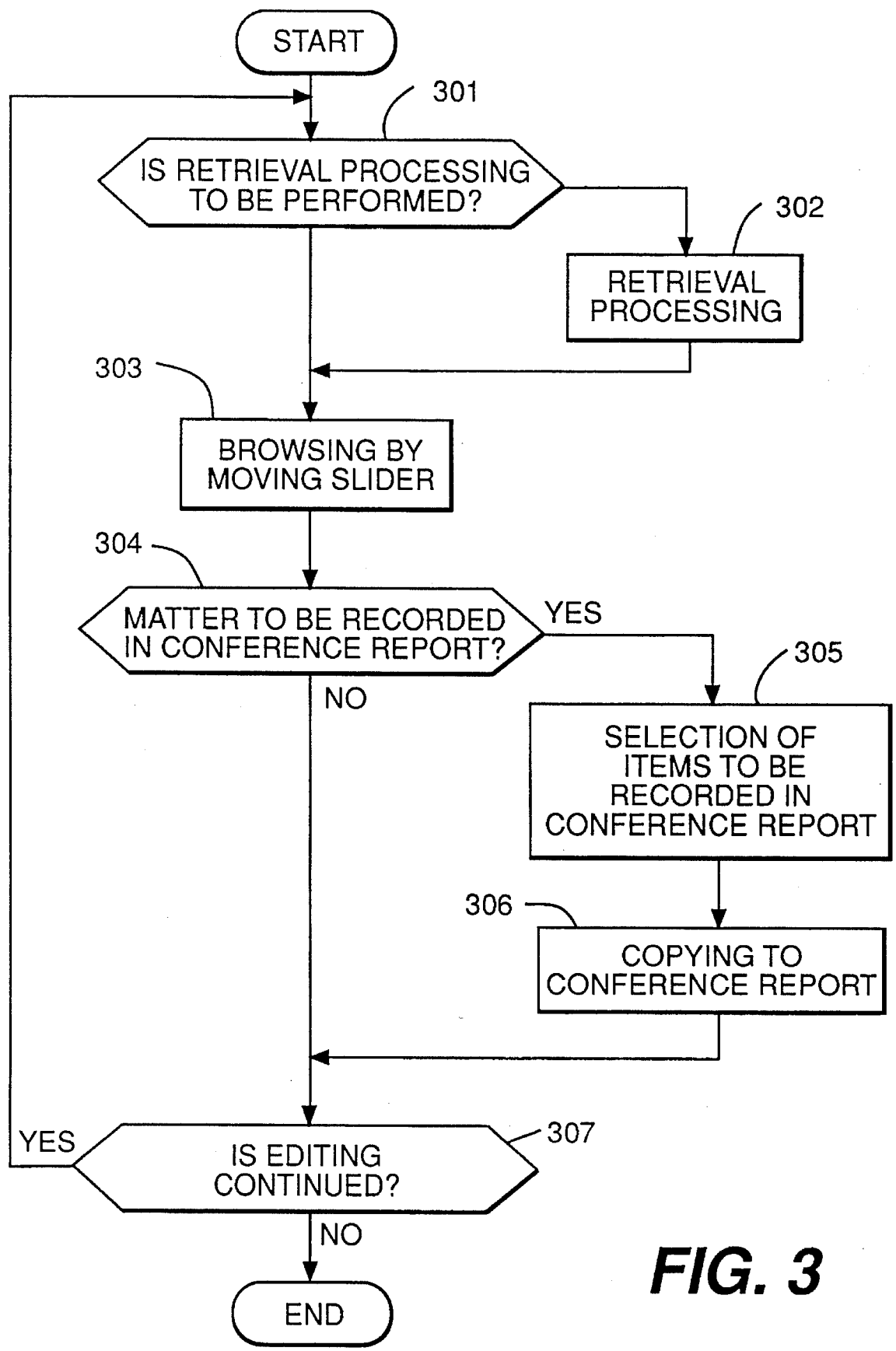
FIG. 3 is a flow chart showing a conference report preparation procedure.

Next, a conference report preparation procedure will be described by referring to the flow chart shown in FIG. 3.

First, it is judged whether to perform the process of retrieval (step 301). When retrieval is yet to be performed, or after retrieval has been performed, the conference images 24 are browsed (step 303) by moving the slider 26 in accordance with both the shade of color showing the significance displayed at the groove of the slider and with the tags 25 in the image display area 22 shown in FIG. 2. When an item to be entered in the conference report is found (step 304), details to be recorded in the conference report are specified (step 305) in the retrieval and browsing 20 to be copied (step 306) to the digest area 30. At step 307, the procedure either returns to step 301 to consider further retrieval, or terminates.

Figure 4:
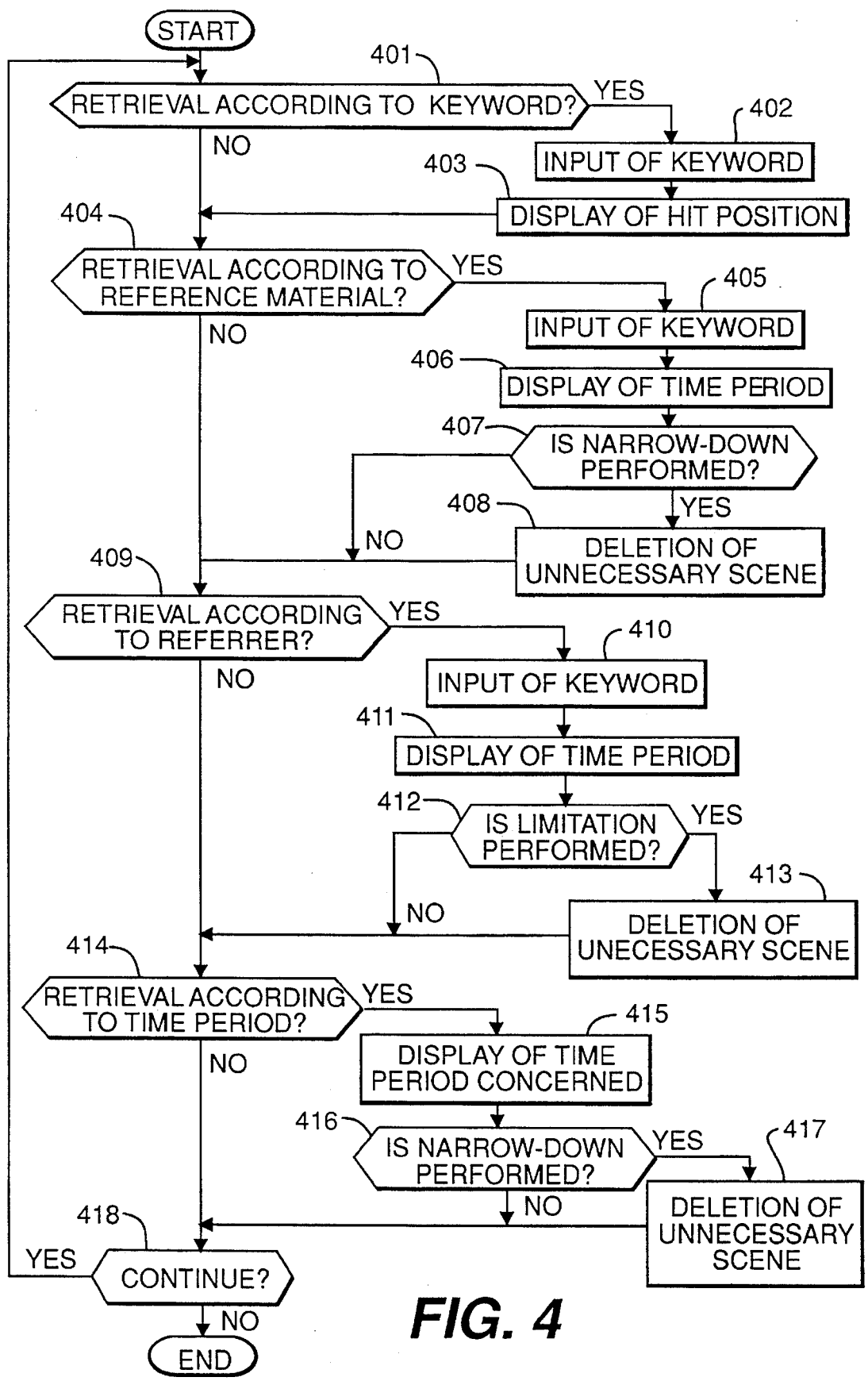
FIG. 4 is a flow chart showing a retrieval procedure.

An example of the retrieval process (step 302) will be described in accordance with the flow chart shown in FIG. 4. First, whether the retrieval is to be performed according to a keyword, reference material distributed or cited during the conference, referrer (person citing, for example, a reference material), or time period of the conference is confirmed (step 401). When the retrieval is carried out according to a keyword (step 402), the image which is specified in the image display area 22 in the retrieval and browsing 20 shown in FIG. 2, and in which the keyword appears, is displayed (step 403). When the retrieval is performed according to a reference material (step 404), a keyword identifying the reference material is input (step 405), and the time period of the conference in which the specified material is referenced is displayed (step 406). To narrow the object area (step 407), areas in time periods other than the above time period are removed from the retrieval and browsing 20 (step 408). Also, when the retrieval is performed according to a referrer (steps 409, 410) or a time period (step 414), the time period of concern is displayed (steps 411, 415), and by removing the areas in the time periods other than the displayed time period from the retrieval and browsing 20 (steps 413, 417), the object area is limited (steps 412, 416). A conference report can thus be prepared by repeatedly browsing and editing the area so limited (step 418).

Figure 1:
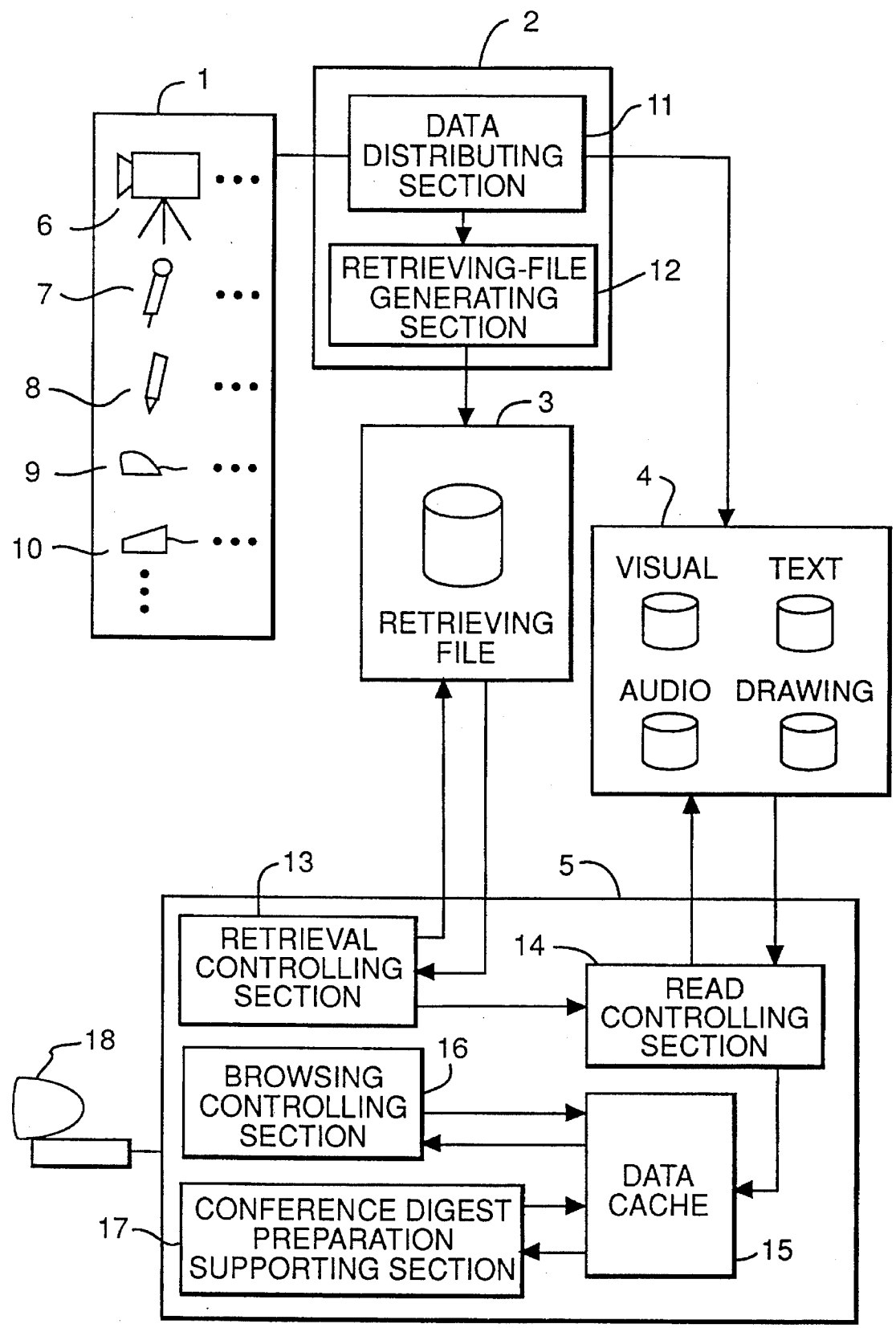
FIG. 1 is an illustration showing a conference report preparation supporting system.

The operation of the conference report preparation supporting system which performs the retrieval process described above will be outlined below by illustrating the operation of each unit shown in FIG. 1.

Figure 5:
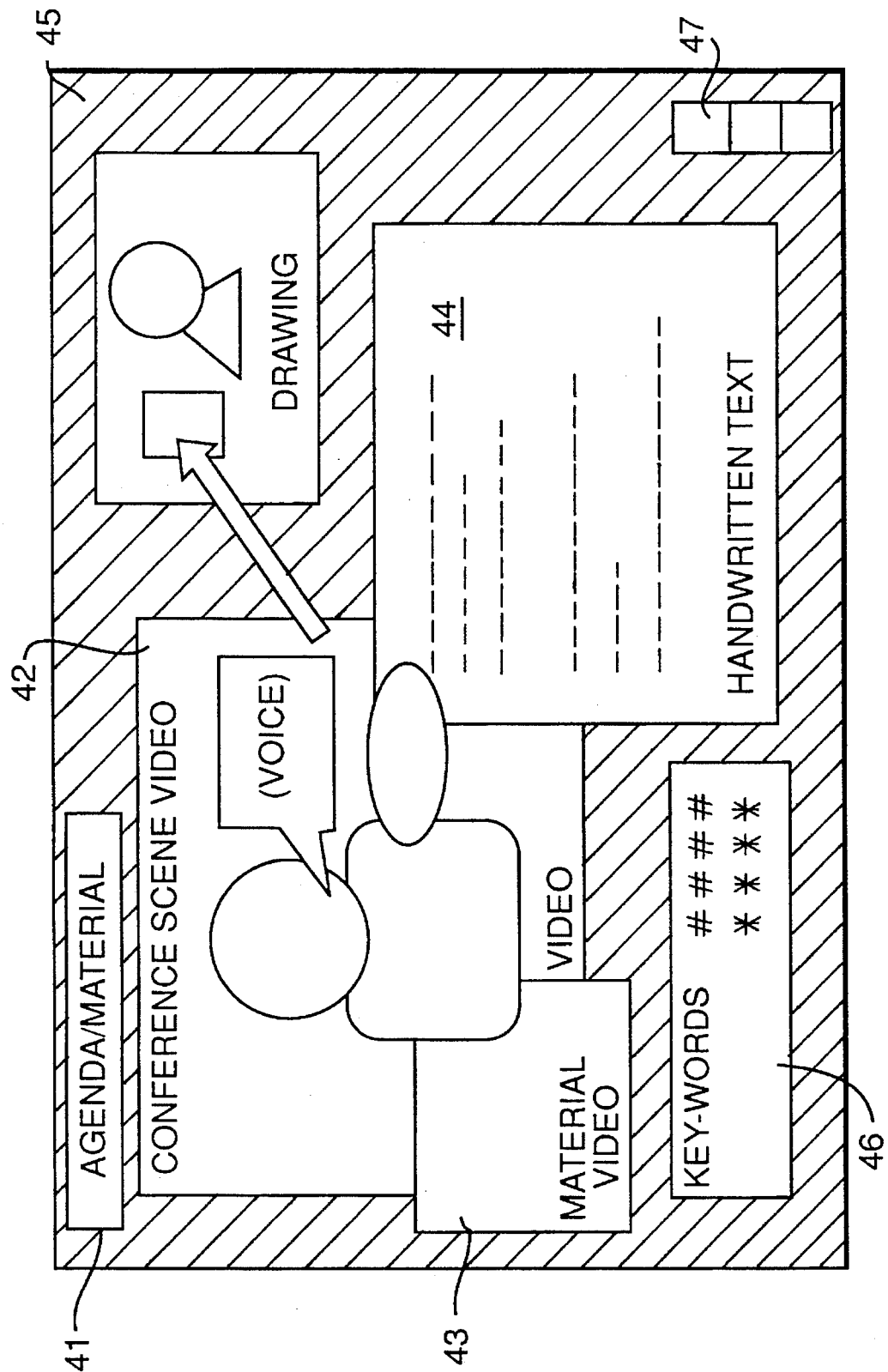
FIG. 5 is an illustration showing an image display screen for a multimedia conference.

A conference system that uses multimedia information (a video conference, for example) provides conference participants with a display screen such as the one illustrated in FIG. 5, by use of the multimedia information input by data input means 1. The data input means may include one or more of an image input unit 6, a voice input unit 7, a handwritten character input unit 8, a pointing unit 9 such as a mouse, and a key-input unit 10 such as a keyboard, for example.

A data registering means 2 registers the multimedia information input by the data input means 1 in a data storing means 4, and also registers three retrieving files, such as a keyword list, an event list, and a significance list, in retrieving-file storing means 3. The keyword list is a file in which keywords which appear in the conference are registered. The keyword list is generated in accordance with the flow chart shown in FIG. 6, and has the contents shown in FIG. 7. In this example, items where "voice" is recorded in the column "Type of Medium", and where "today" is recorded in the column "Keyword", represent that the spoken word "today" is input at the time of concern. Events such as speeches given during the conference and reference materials discussed or distributed in conjunction with the conference are registered in the event list, which is generated in accordance with the flow chart shown in FIG. 8 and has the contents shown in FIG. 9. Moreover, the significance list is used as a reference when retrieving an important item produced in the conference, and is generated in accordance with the procedure shown in FIG. 10 to have the contents shown in FIG. 11. The procedures for generating the above lists will be described below with respect to various embodiments of the invention.

A conference report preparation supporting means 5 reads multimedia information from the data storing means 4 in accordance with a reference to the keyword, event, and significance lists stored in the retrieving-file storing means 3, and supports the preparation of a conference report by displaying and editing the read information. More particularly, a retrieval controlling section 13 narrows down the scenes in which an important item appears by retrieving a retrieving file stored in the retrieving-file storing means 3. For example, when a retrieval according to a retrieval keyword is specified, it is possible to know the time when the retrieval keyword appears by referring to the keyword list. That is, to know the scene in which a chairman says "product plan", "chairman" is retrieved from the "Retrieval Person" column, "voice" from the "Type of Medium" column, and "product plan" from the "Keyword" column in the keyword list illustrated in FIG. 7.

Similarly, when a retrieval according to a reference material is specified, it is possible to know the time in which a specified reference material or materials are cited by referring to the event list. That is, to know the time approximation in which material "1" is cited, "material" in the "Type of Medium" column and "1" in the "Medium Number" column is retrieved from the event list illustrated in FIG. 9.

A data read section 14 reads multimedia information corresponding to the time period narrowed down by the retrieval controlling section from the data storing means 4, and writes the multimedia information to a data cache 15. A browsing controlling section 16 browses details shown in the retrieval and browsing 20 of FIG. 2 based on the multimedia information written in the data cache 15. Finally, a conference report preparation supporting section 17 supports the preparation of a conference report by displaying only those areas including important items of the multimedia information written in the data cache 15 in the digest area 30.

According to the outline set forth above, the conference report preparation supporting system of the present invention makes it possible to greatly decrease the time required to prepare a conference report, because scenes including important items can be narrowed down in accordance with a keyword which appears in the conference, reference materials, material referrer, speakers, or time period of the conference.

An exemplary embodiment of the present invention will be described below in detail by referring to the accompanying drawings. As mentioned above, FIG. 1 shows the constitution of a multimedia conference report preparation supporting system constructed according to the teachings of the present invention. The system comprises data input means 1, including an image input unit 6 such as a camera, a voice input unit 7 such as a microphone, a handwritten character input unit 8, a pointing unit 9 such as a mouse, and a key-input unit 10 such as a keyboard; data registering means 2 including a data distributing section 11 for distributing various data obtained from the input units, and a retrieving-file generating section 12 for generating a retrieving file by analyzing these data; retrieving-file storing means 3 for storing a retrieving file generated by the retrieving-file generating section 12; data storing means 4 for recording obtained data; and conference report preparation supporting means 5 for referring to the retrieving file stored in the retrieving-file storing means 3, for reading data of concern from the data storing means in accordance with the result of reference to the retrieving file, and for preparing a conference report by displaying and editing the details of a conference.

The conference report preparation supporting means 5 comprises a retrieval controlling section 13 for retrieving data meeting a specified retrieval condition by referring to the retrieving file stored in the retrieving-file storing means 3, a read controlling section 14 for controlling the reading of conference information from the data storing means 4 in accordance with the retrieval result obtained by the retrieval controlling section 13, a data cache 15 for buffering the conference information read from the data storing means 4, a browsing controlling section 16 for browsing the details of a conference in accordance with the conference information stored in the data cache 15, and a conference digest preparation supporting section 17 for supporting the preparation of the digest of a conference in accordance with the contents edited by the browsing controlling section 16.

Concrete operations of the system will be explained by dividing the operations into those that are performed while a conference is progressing, and those that are performed while a report is being generated (typically, after the conclusion of the conference).

Before describing the operations of the system in a conference setting, a method for executing a multimedia conference will be briefly described below. FIG. 5 is a common display format used during a multimedia conference. The multimedia conference, as its name implies, is a conference using a plurality of media, and often an electronic whiteboard or blackboard has been employed to provide the changing display (hereafter referred to as an electronic whiteboard). Typically, the electronic whiteboard, as shown in FIG. 5, comprises a tile 41 showing the name of a conference, a conference scene display area 42 for displaying a conference scene, a video display area 43 for displaying video reference material, a text area 44 for displaying text material, a line drawing display area 45 for displaying reference diagrams, and a keyword area 46 for automatically detecting and displaying a keyword derived from these images. Moreover, the electronic whiteboard is provided with auxiliary operation buttons 47 for adding auxiliary information to the conference report preparation supporting system during the conference. The auxiliary operation buttons 47 are operated by a mouse or pen in order to designate an important item, or to designate that a matter has been decided or determined (resolved). It is possible for conference participants to freely write data in the electronic whiteboard described here, similarly to a conventional whiteboard or blackboard. That is, conference participants can write data in the screen by using a pen or mouse.

The following is a brief description of how to proceed with the conference using the electronic whiteboard described above. A conference participant displays prepared conference materials on the electronic whiteboard as necessary. Line drawings, text, dynamic and static images, and voice information are available as the conference materials. Conference participants proceed with the conference while referring to the presented materials, and write the details of proceedings on the electronic whiteboard, using an input unit such as a pen or mouse, as necessary.

The following is a description of operations of the inventive system during a conference.

As previously noted, the data input means of the present invention may comprise any of the dynamic image input unit 6, voice input unit 7, handwritten character input unit 8, pointing unit 9, and key-input unit 10. Multimedia information received by the data input means 1 is input to the data registering means 2. The data registering means 2 registers the multimedia information in the data storing section 4 and generates the three retrieving files described previously (keyword list, event list, and significance list). A method for generating each retrieving file and an outline of the three files will be briefly described below.

Figure 6:
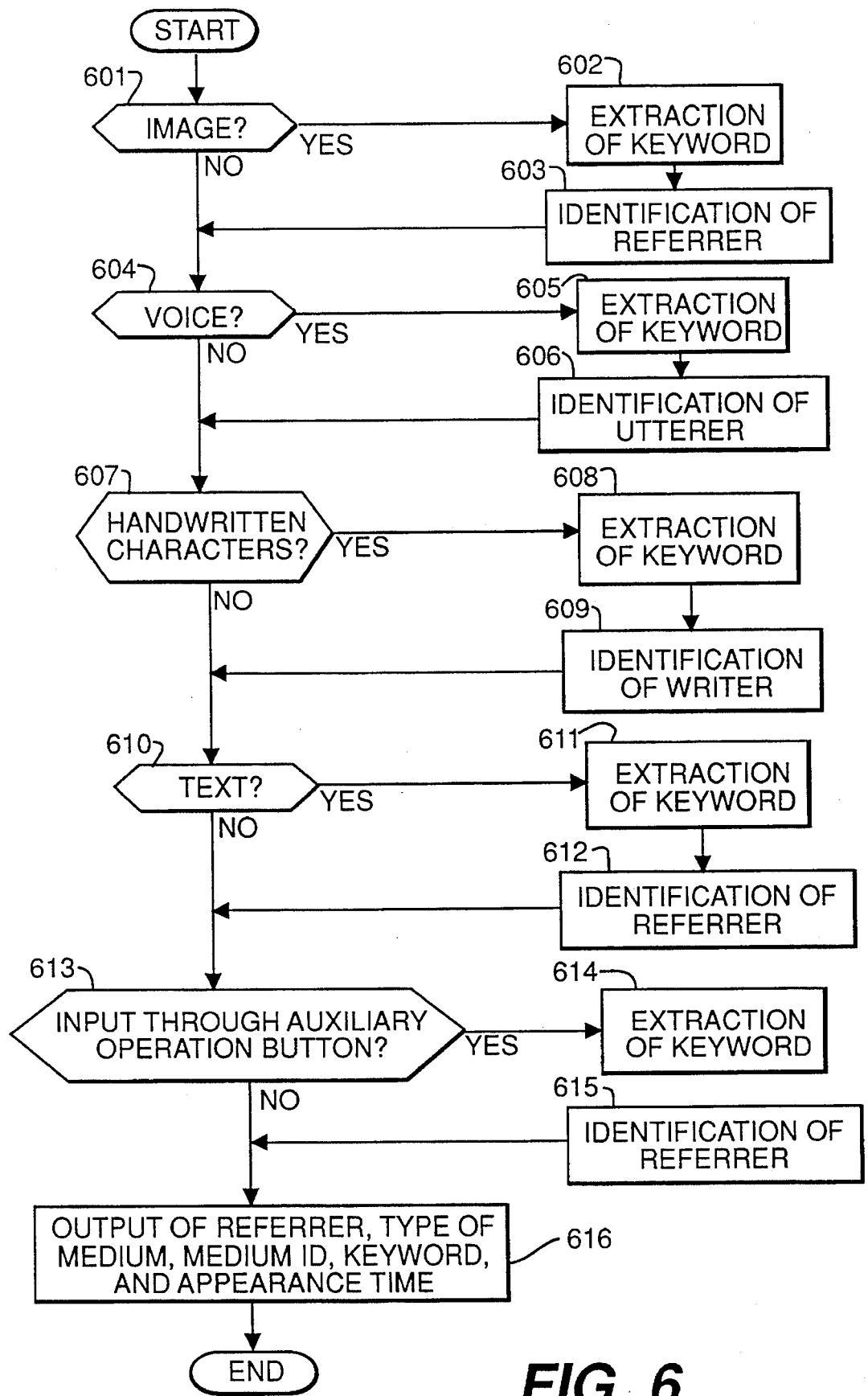
FIG. 6 is a flow chart showing a keyword list preparation procedure.

First, a method for generating a keyword list will be described by referring to the flow chart shown in FIG. 6. To generate the keyword list, when the medium of information received through the data input means 1 is determined to be an image (step 601), a keyword is extracted by image recognition processing, such as gesture recognition (step 602). Then, a referrer is identified from the identification number of the image input unit through which the image is input and that of a key-input unit such as a keyboard used for specifying the image display (step 603). When the medium is determined to be voice (step 604), a keyword is extracted through voice recognition processing (step 605), and the speaker is identified from the identification number of the voice input unit through which the speech is input and by executing feature extraction of the input voice (step 606).

Moreover, when the medium is determined to be handwritten characters input through a handwritten character inputting unit (step 607), a keyword is extracted through character recognition processing (step 608), and the handwriting source is identified from the identification number of the handwritten character input unit through which the characters are input and by executing feature extraction of the input character (step 609). Furthermore, when the medium is determined to be text (step 610), a keyword is extracted through morpheme analysis (step 611), and the text referrer is identified from the identification number of a key-input unit such as a keyboard by which the text display is specified (step 612). Furthermore, when an input is made through the auxiliary operation button 47 with respect to an item which a conference participant feels to be important (step 613), a keyword corresponding to each such operation is output (step 614) and the referrer (operator) is identified from the identification number of the operated unit having the auxiliary operation button 47 (step 615).

When a keyword is obtained, the referrer, type of input medium (such as image, voice, etc.), and identification number of each medium are registered in the keyword list correspondingly to each keyword (step 616).

A keyword list generated in the above manner is shown in FIG. 7 In this keyword list, "marker" is output to the "Type of Medium" column and "determined" is output to the "Keyword" column, according to the input through an auxiliary button corresponding to "determined".

Figure 8:
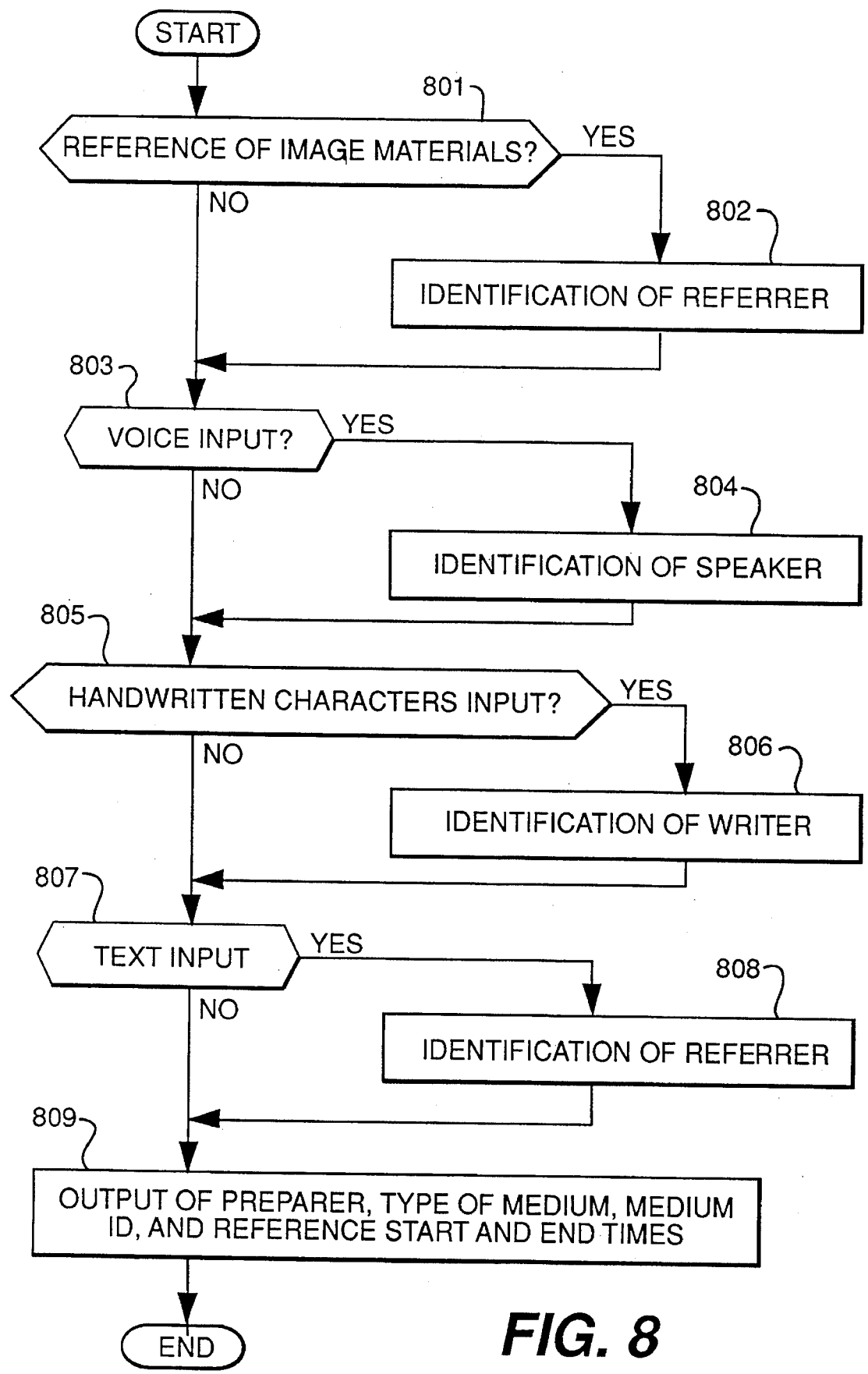
FIG. 8 is a flow chart showing an event list preparation procedure.

Second, a method for generating an event list will be described by referring to the flow chart shown in FIG. 8. To generate the event list, it is judged whether an event which occurs during the conference is a reference of image materials (step 801), a voice input (step 803), an input of handwritten characters (step 805), or a textual input (step 807). When the event is a reference of image materials, the referrer is identified from the identification number of the image input unit through which the image is inputted and that of a key-input unit such as a keyboard used for specifying the image display (step 802). When the event is a voice input, the speaker is identified from the identification number of the voice input unit through which the voice information is input and by executing feature extraction of the input voice (step 804). When the event is an input of handwritten characters, the writer is identified from the identification number of the handwritten character input unit through which the handwritten characters are input and by executing feature extraction of the input characters (step 806). When the event is a display of text, the referrer is identified from the identification number of a key-input unit such as a keyboard used for specifying the text display (step 808). With respect to the events which occur during a conference, the referrer of each event, type of medium, medium ID, and times when the references are started and ended are registered in the event list similarly to the generation of the keyword list (step 809).

An event list generated in the above manner is shown in FIG. 9.

Third, the significance list will be described below.

In the significance list, the keywords detected in generation of the keyword list and the events detected in generation of the event list are respectively weighted. When an important keyword appears or an important event occurs in a conference, a value obtained by weighting the keyword or event is output together with time information regarding the time of occurrence of the keyword or event. That is, the significance list is a support of the selection of a scene in which an important item (keyword or event, for example) appears by showing the value to a conference report preparer as time-series information when the conference report is prepared, and by showing the preparer the time in which an important keyword frequently appears, is written or spoken (depending upon the input medium and means).

Figure 10:
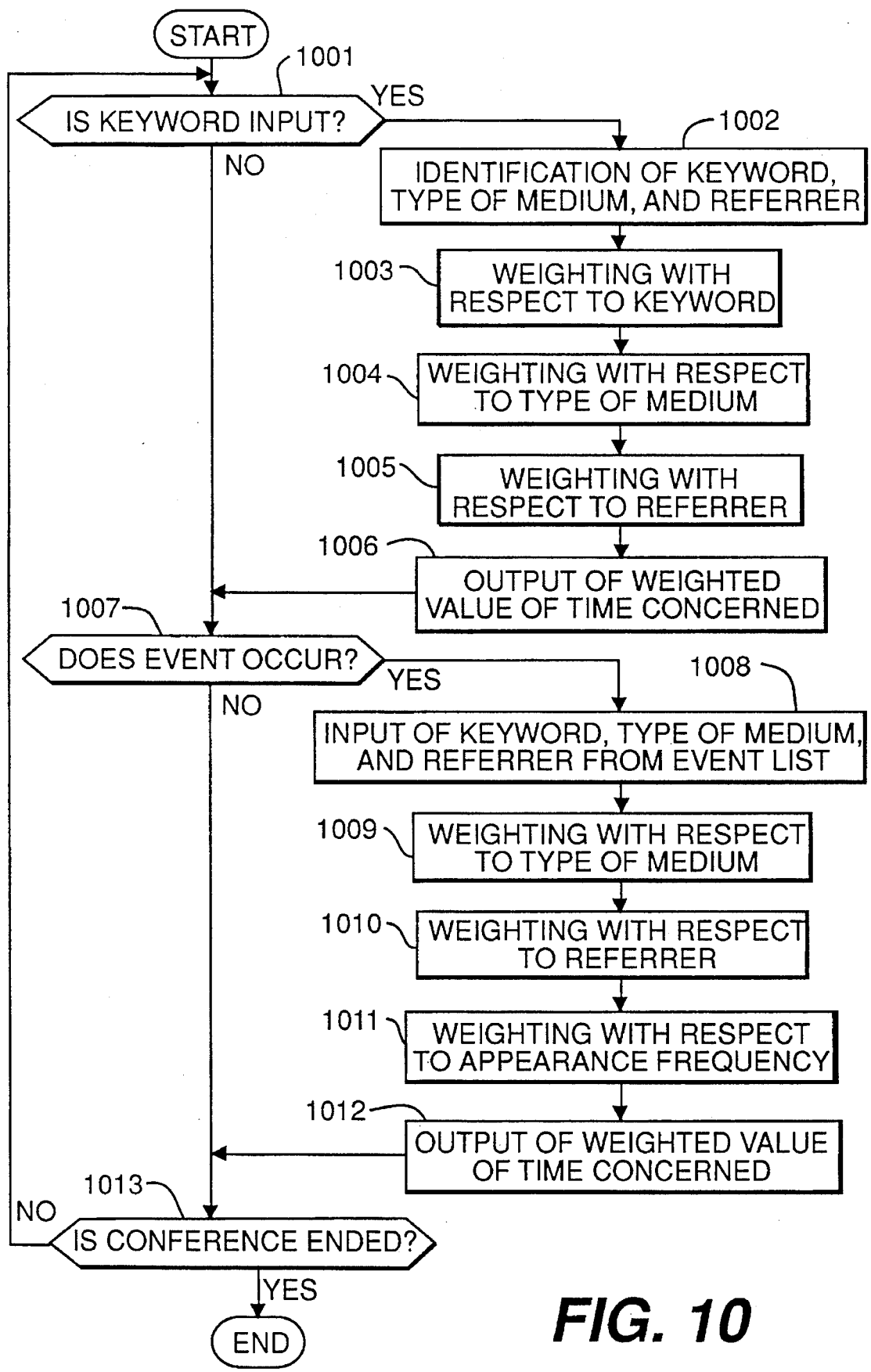
FIG. 10 is a flow chart showing a significance list preparation procedure.

A method for generating a significance list will be described below by referring to the flow chart shown in FIG. 10. First, a keyword is detected in the same way as that of the generation of the keyword list (steps 1001, 1002). Then, the detected keyword is weighted according to whether the keyword is an important word such as "determined" (representing that an issue has been determined or resolved, for example) or "subject" (representing that the keyword identifies a topic of presentation) in the conference (step 1003). When the keyword is written on a handwritten character input unit, it is weighted higher than a spoken keyword in accordance with the medium where the keyword appears (step 1004). Moreover, when the keyword is referred to by the chairman or another important person, such as a featured speaker or a person in charge of the expediting, it is higher weighted in accordance with the referrer (step 1005). The value thus weighted is outputted to the significance list as a value weighted with respect to the time when the keyword appears (step 1006).

Next, the method determines whether an event is detected in the same way as that of the generation of the event list (steps 1007, 1008). If so, the detected event is weighted with respect to the type of medium (step 1009) and the referrer (step 1010) similarly to the case of the keyword weighting, and also weighted with respect to the appearance frequency of the event (step 1011). Then, the calculated weighted value is added to the value in the significance list and output as a weighted value of the time concerned (step 1012), after which the method decides to proceed to the next keyword or ends (step 1013).

Figure 11:
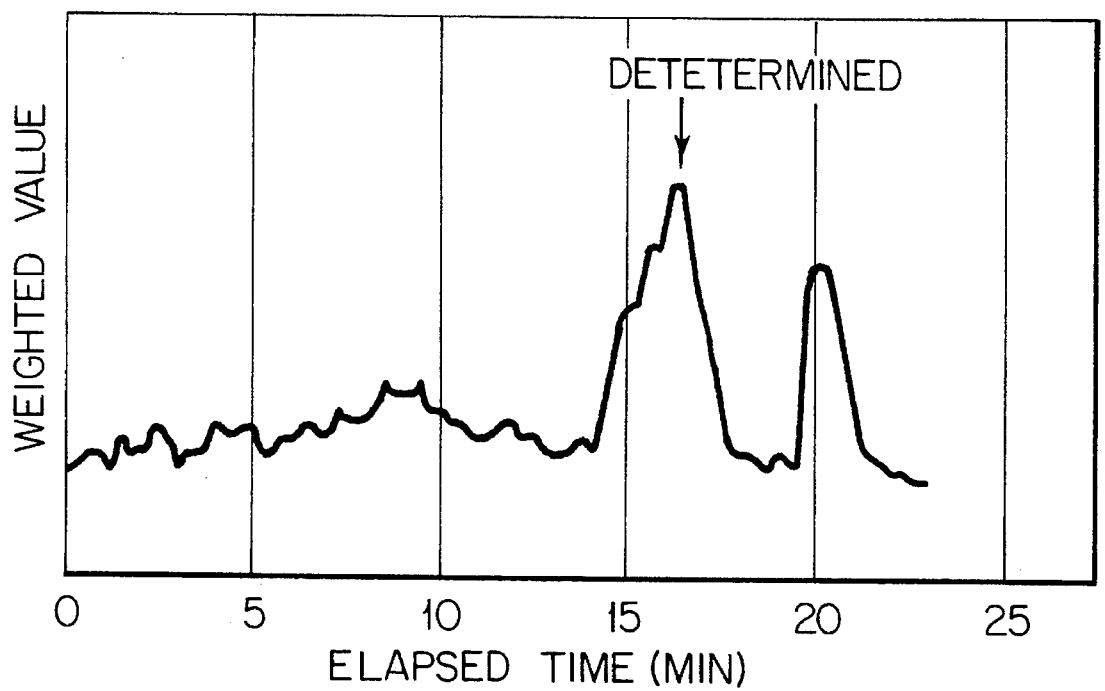
FIG. 11 is an example of a significance list.

A significance list generated in the above manner is shown in FIG. 11. The operations of this system during a conference have been described above.

Next, system operations during preparation of a conference report will be described.

Figure 12:
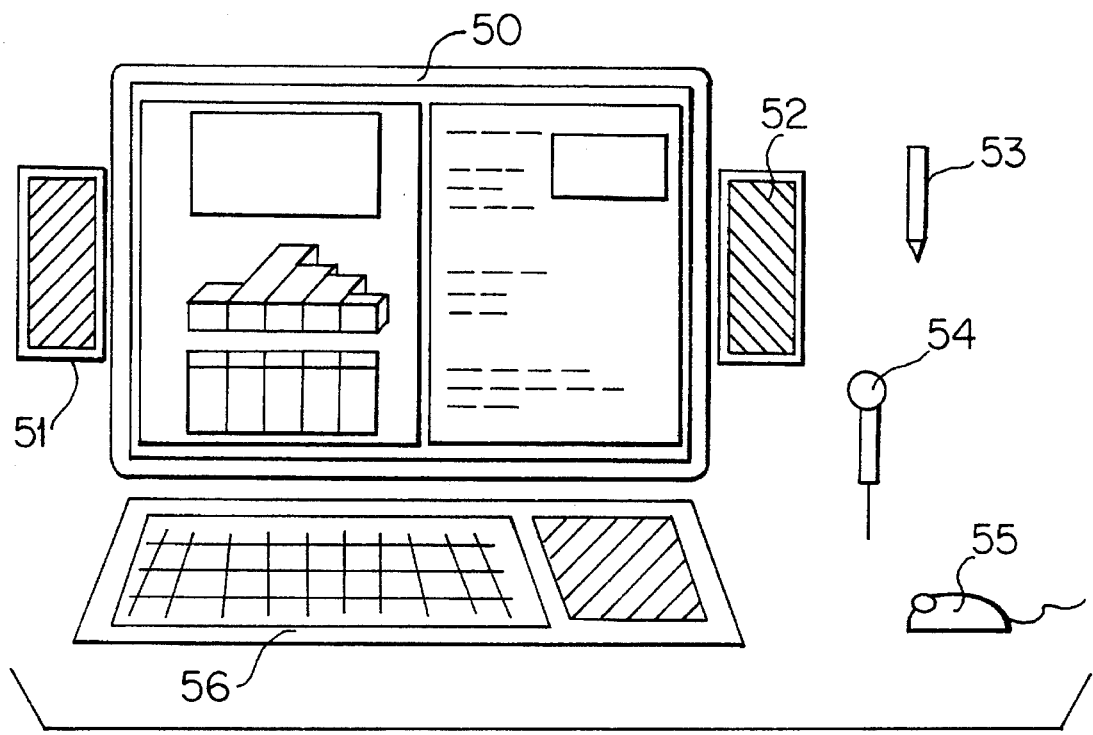
FIG. 12 is an illustration showing an environment of a conference report preparation supporting system.

FIG. 12 is a schematic illustration of an environment supporting the preparation of a conference report. This environment is constituted to conversationally prepare a conference report, and comprises an image displaying unit 50 for displaying multimedia conference data, loudspeaker units 51 and 52 for reproducing voices and other sounds, a keyboard 56 for inputting conditions for retrieval and inserting auxiliary information into minutes, a microphone 54, a handwritten character inputting unit 53, and a mouse 55 for performing a pointing operation. The image displaying unit 50 in FIG. 12 displays a material image and a conference digest, both for preparing a conference report. The loudspeakers 51 and 52 reproduce speeches given during a conference, and a sound signal accompanying a video image shown as a conference material. The handwritten character inputting unit 53, mouse 55, and keyboard 56 are used to execute designation operations of inputting or retrieving a keyword.

To prepare a digest, the microphone 54 is used as an inputting unit for adding vocal annotations to the digest or for designating a retrieval operation by voice. Detailed functions of the above units will be described with respect to the following embodiments.

In a multimedia conference, because the conference materials and the video showing the progress of the conference are provided electronically, there are advantages in that it is possible to support the progress of the conference and to facilitate the preparation of the record of the conference by establishing an electronic conference report preparation environment as shown in FIG. 12. The following is a description of a conference report preparation method according to a preferred embodiment of the present invention.

It is assumed that a conference report is prepared by a representative of the conference participants after the conference ends. To prepare the conference report, preferably only essential points of the conference are extracted while conversationally retrieving and editing the multimedia conference record data collected during the conference. The present invention is made to provide an environment in which retrieval and edition can be performed easily and quickly.

FIG. 2 schematically illustrates a screen set-up of a system used to prepare a conference report. This image is displayed on the image displaying unit 50 having the conference report preparation environment shown in FIG. 2. The image display screen comprises an area 20 for displaying an image of a reference material for retrieval or browsing (hereinafter referred to as a retrieval area), and a digest area 30 for preparing a conference report digest by using the materials in the retrieval area. The retrieval area 20 comprises an enlarged image display area 21 for enlarging and displaying videotaped images or materials shown during the conference, an area 22 for displaying the flow of images corresponding to the passage of time during the conference, and a non-image information display area 23 for displaying conference information other than the images shown in area 22.

The digest area 30 has a conference report preparation template including items indispensable for the preparation of a conference report. The template includes the name, date, place, and participants of a conference, the list of matters determined or resolved in the conference, the items which are not determined in the conference and therefore suspended, the schedule of the next conference, and the items to be studied by the next conference. Moreover, window areas 31, 32, 33, 34, and 35 are provided in the area 30 to display dynamic images, static images, and line drawing information such as drawings relating to the above items. The sizes of the windows and the number of windows are not restricted to those shown in FIG. 2. It is easily understood that a multi-window display is preferable in accordance with the number of items determined or the number of related sheets of materials.

As described above, the retrieval area 20 includes the area 22 for displaying images corresponding to the passage of time of a conference. Collectively, the images showing the passage of time are hereafter referred to as an image volume and the area for displaying the image is hereafter referred to as an image volume area. The method for displaying the image volume will be described later by referring to FIGS. 13(A)–13(B).

In the image volume area 22, images retrieved by a retrieval keyword are displayed in the form of a rectangular parallelepiped for each relevant item. That is, when an image and a keyword related to an item are newly designated, images related to the keyword are automatically fetched from the data storing means 4, and these images are arranged as an image volume and displayed. Moreover, information (e.g., a list of the speakers, the running time of the discussion, the list of keywords, and referred-material numbers) other than the images related to the image volume are arranged and displayed in the non-image information display area 23. The conference report preparer prepares the digest by setting new retrieval conditions by use of information other than the displayed images, and by executing re-retrieval.

Important features of the embodiment shown in FIG. 2 include facilitating the preparation of a conference report by simultaneously generating the retrieval area 20 for displaying material images for retrieval and the digest area 30 for displaying a conference report constituted by the material images on a display screen, conversationally retrieving conference images, speakers' voices, material images, and data written during discussions which are necessary for the preparation of a conference report in the retrieval area 20, editing material data obtained through the retrieval, moving material data to the digest area 30, and recording the data again. As described above, it is a feature of the present invention that an area for displaying conference materials and an area for preparing a digest are simultaneously displayed, and retrieval and editing are conversationally repeated to prepare a conference report while freely moving between the areas.

Figure 13A:
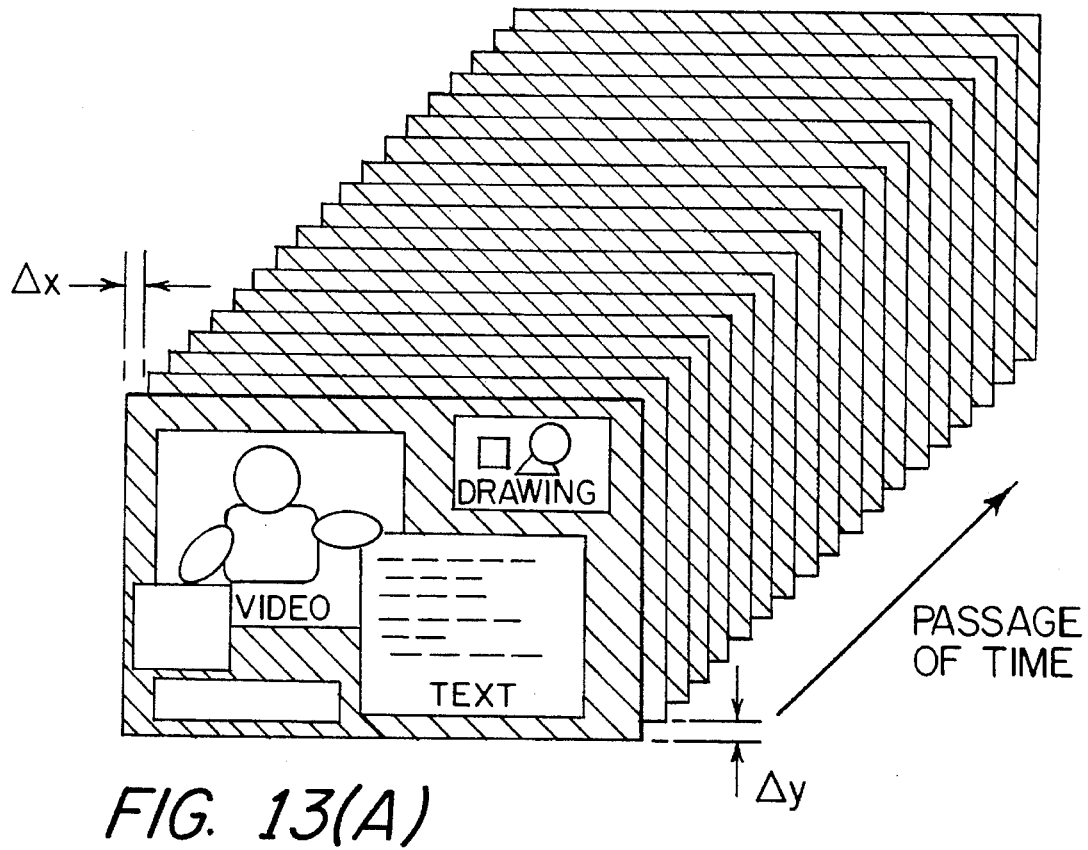
FIGS. 13(A) and 13(B) are illustrations showing a method for displaying image data.

FIG. 13(A) is an illustration for explaining a method for producing and displaying an image volume, which is a method of displaying images that change with time (i.e., images from different times of the conference) while slightly shifting them in X and Y directions of the display to reflect the passage of time from image to image. Because the images thus displayed occupy different locations representing different times due to the slight shifting, the images form a dimensionally-drawn rectangular parallelepiped. This display method helps to intuitively understand the significance of a volume of meaningful images because the details of the images are shown representatively by the forefront image (i.e., the image at the front of the image volume, or "stack"), and the passage of time is indicated by the length of the side extending diagonally into the view. Moreover, because the forefront image is entirely displayed but only the uppermost and rightmost portions of the subsequent background images are slightly displayed, the flow of images can be displayed in a small area. When a large change occurs in an image, it is possible to note the change from a change of brightness or color even at the slightly displayed uppermost and rightmost portions of the background images. The present invention uses the volume image display method to retrieve desired data out of the conference material images.

Figure 13B:
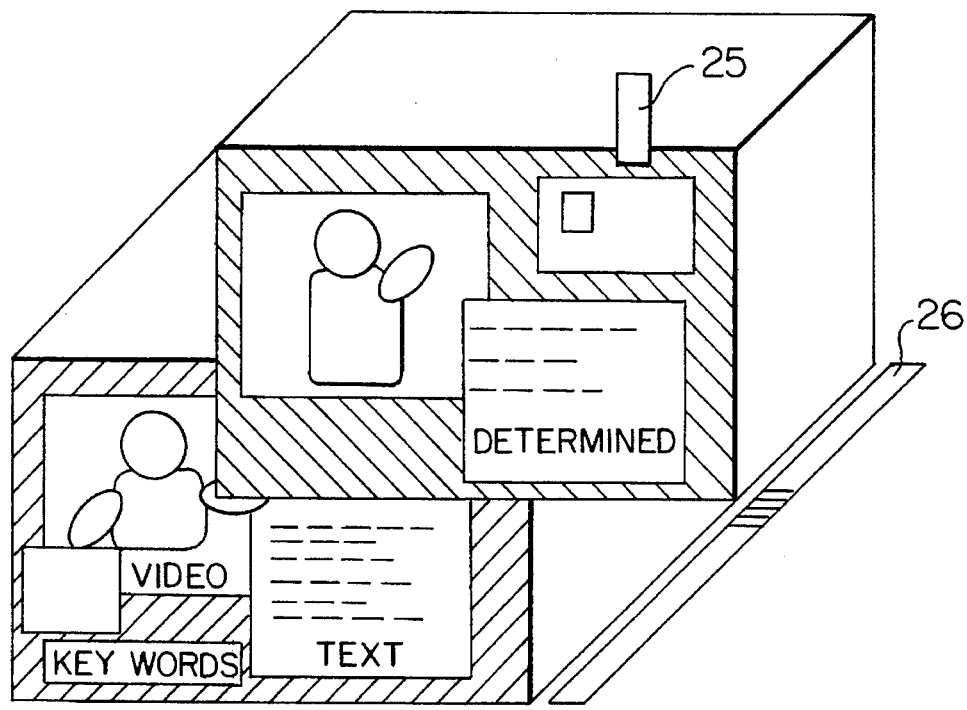

FIG. 13(B) is an illustration showing an embodiment for displaying important matters of a conference by using the above image volume display method. As previously described, the conference report preparation supporting system analyzes details of the conference in real time to generate a retrieving file. In the case of this file generation, markers and keywords are given to simplify the retrieval using such input information as voice, handwritten characters, gestures (for recognizing actions of the conference participants), key-input information, or information inputted from the auxiliary operation buttons 47. Further, to display an image, metaphors such as tags are used to clearly highlight images provided with the above markers and contained in the volume display of the images. For example, in the case of the embodiment in FIG. 13(B), the input "determined" is recognized in the written conference materials, and the image provided with the marker "determined" and the tag 25 is thus displayed. It is also possible to display an image to which only a tag is given in the display method in FIG. 13(A). By clearly displaying "determined" matters by means of the attached tags, it is possible to review the determined matters in a short time without having to scan through all discussions leading up to such determinations, until the termination of the proceedings.

As previously described, the image volume 22 corresponds to the retrieval keyword, and is generated by collecting related images. Therefore, the image volume 22 may include a plurality of determined matters. When there are a plurality of determined matters, it is possible to clearly show them to a user by using a plurality of tags. Moreover, in the case of this image display method, a slider 26 may be provided for changing the displayed time period in the vicinity of the images so that a user can specify the displayed conference time by using the slider 26. Such sliders and functionally similar means per se are well known in the art, and the slider 26 of the present invention may take any suitable form. For example, the slider 26 may be a software-generated graphic activated using the pointing device 9 and associated cursor in a similar manner as is conventional for scrolling through a file listing display in a program such as WINDOWS.

Furthermore, a specified image can be displayed at the forefront of the image volume by using the slider 26, and the color or shade at the groove of the slider 26 can be employed as an indicator of the value of the specified in the significance list. Thus, by previously providing a mark on the slider so that an important portion can easily be found, a user can more quickly reach an important material image. Then, the material image at the time of designation can be confirmed by displaying it in the enlarged image display area 21.

As described above, it is possible to refer to various conference scenes and data values by using the enlarged image display area. Moreover, it is possible to simultaneously display various pieces of information such as a conference scene, text information, video material, and a keyword in the enlarged image display area, or to selectively display a subset of the above media. It is preferable to select the best display method in accordance with the retrieval situation.

Moreover, this embodiment describes only the slider 26 as an interface for time or image specifying. However, the present invention contemplates any suitable interface unit by which a user can set any reproducing time or access any desired image. Therefore, any method can be used as long as it allows a user to conversationally set a reproducing time. By using a method for making it possible to reproduce data at any time, the present invention supports a user who makes a digest while conversationally displaying material data and images of a conference.

Figure 14:
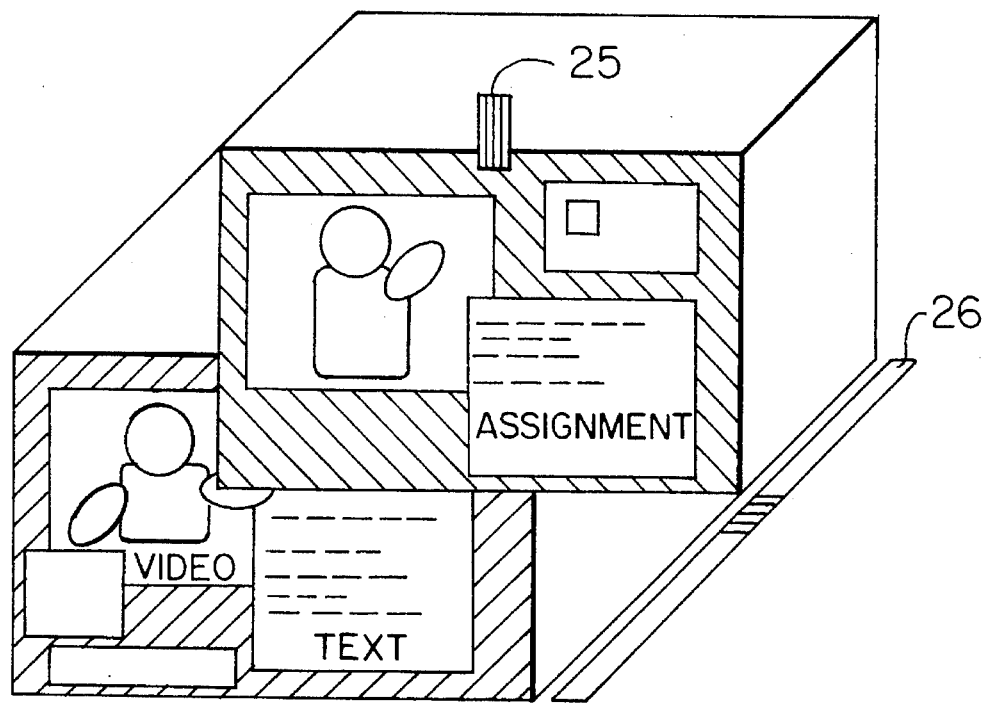
FIG. 14 is an illustration in which a tag marker is attached to an assigned matter.
Figure 15:
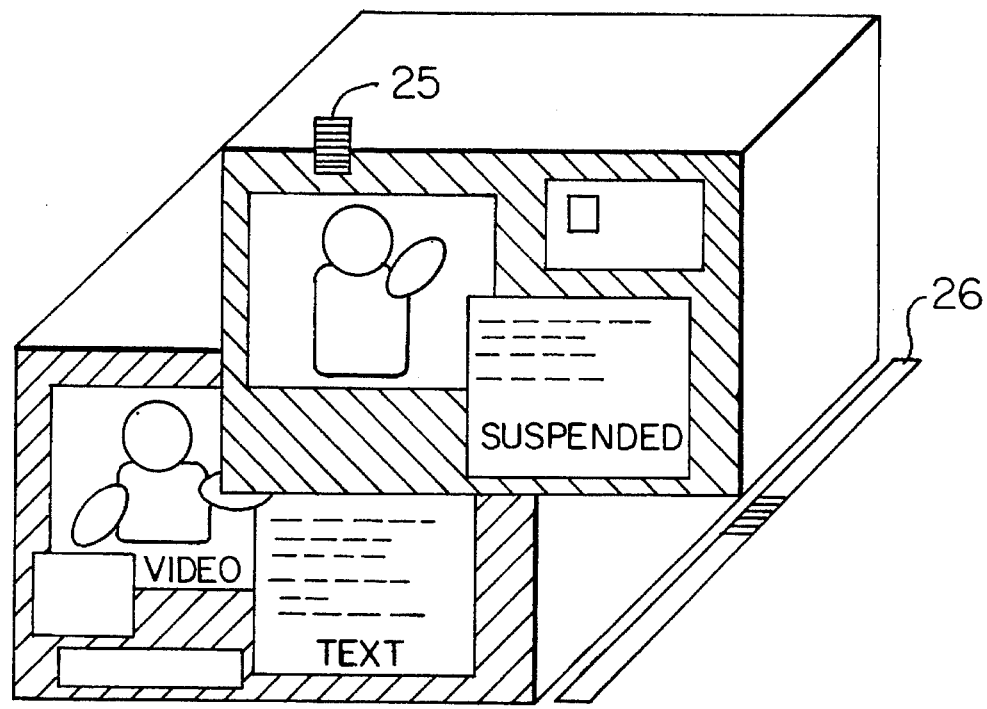
FIG. 15 is an illustration in which a tag marker is attached to a suspended matter.

FIGS. 14 and 15 show embodiments in which the image display method described in FIGS. 13(A)–(B) is adapted to "assigned" matters and "suspended" matters. FIG. 14 shows an example in which no proceedings are "determined" and, therefore, all proceedings are left over until the next conference as suspended ("assigned") matters. FIG. 15 shows a case where suspended items are displayed. In the case of the embodiments in FIGS. 14 and 15, a tag showing assignment or suspension is clearly attached to an image showing conference materials or a conference scene by referring, for example, to speech contents during a conference, text written on a multimedia whiteboard, gestures of and key-inputting by conference participants, or an assignment marker or suspension marker given according to auxiliary operation data. In FIGS. 14 and 15, matters considered sufficiently important to be included in the conference minutes are also displayed by using tags. It is preferable to show that the images or data are different from "determination of proceedings" images or data by using tags different from those shown in FIGS. 13(A)–(B). However, when the purpose is merely to display important matters, it is possible to use the same tags, so long as the user can unambiguously select a desired image.

Figure 16A:
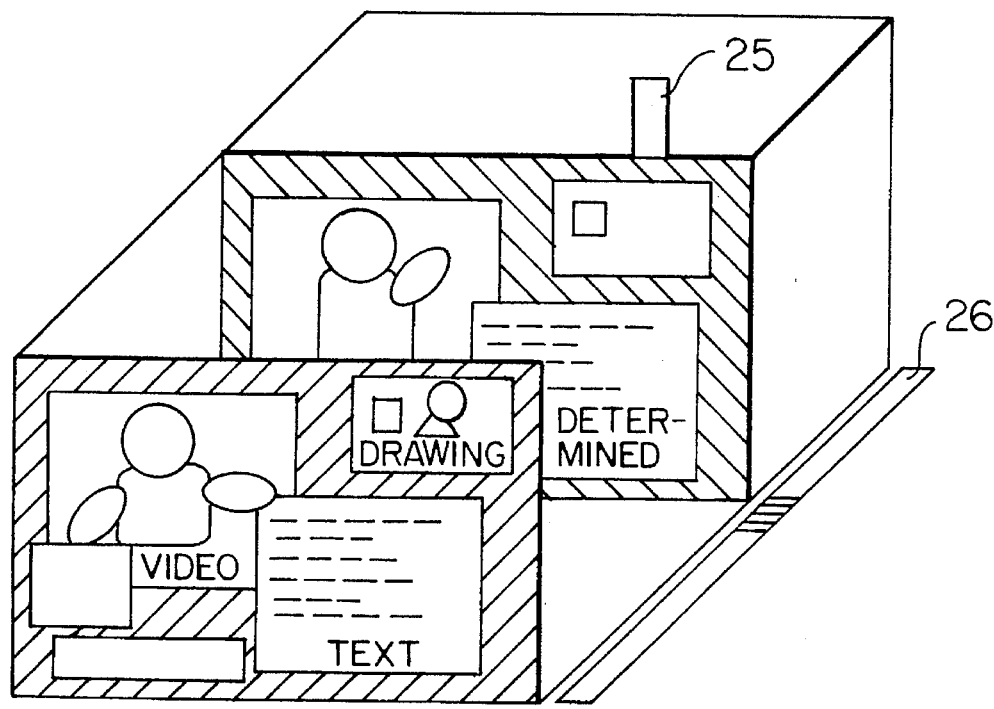
FIGS. 16(A) and 16(B) illustrate display of an important image at the forefront of an image volume.
Figure 16B:
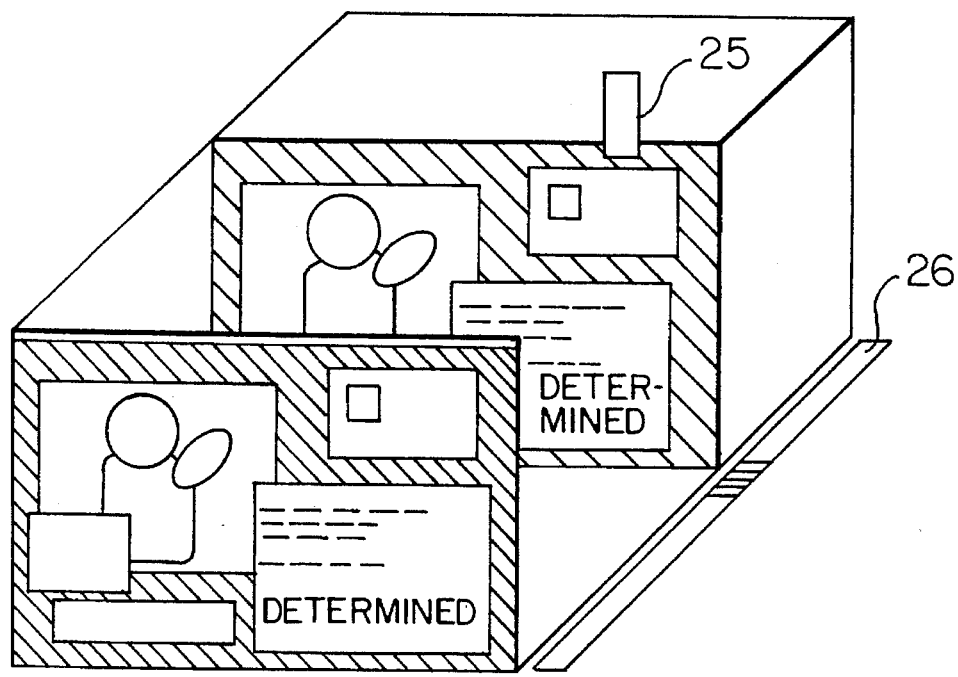

FIGS. 16(A)–(B) show a modification of the displaying method shown in FIGS. 13(A)–(B). Recall that in FIGS. 13(A)–(B), display of the forefront image of materials in an image volume display was described. By the method for using the forefront image of materials, an image free of annotation or deformation is displayed. Therefore, the image does not always reflect the details of proceedings, and it may be difficult to understand the details of the proceedings at a glance.

Thus, to improve the embodiment of FIG. 13, the embodiment shown in FIGS. 16(A)–(B) is constituted so as to previously retrieve an image with a determination marker and to display the image as the forefront image. Moreover, because the passage of time until proceedings are determined is also important to the conference record, the tag metaphor is displayed at the time of determination of proceedings similarly to the case of the embodiment in FIGS. 13(A)–(B). However, this embodiment is particularly characterized by bringing the most important image among a series of images of proceedings to the forefront so that the details of "determined" proceedings can be understood at a glance. Note, too, that this image display method can also be employed to display "suspended" matters, "assigned" matters, or other important matters, in addition to "determined" matters.

Figure 17:
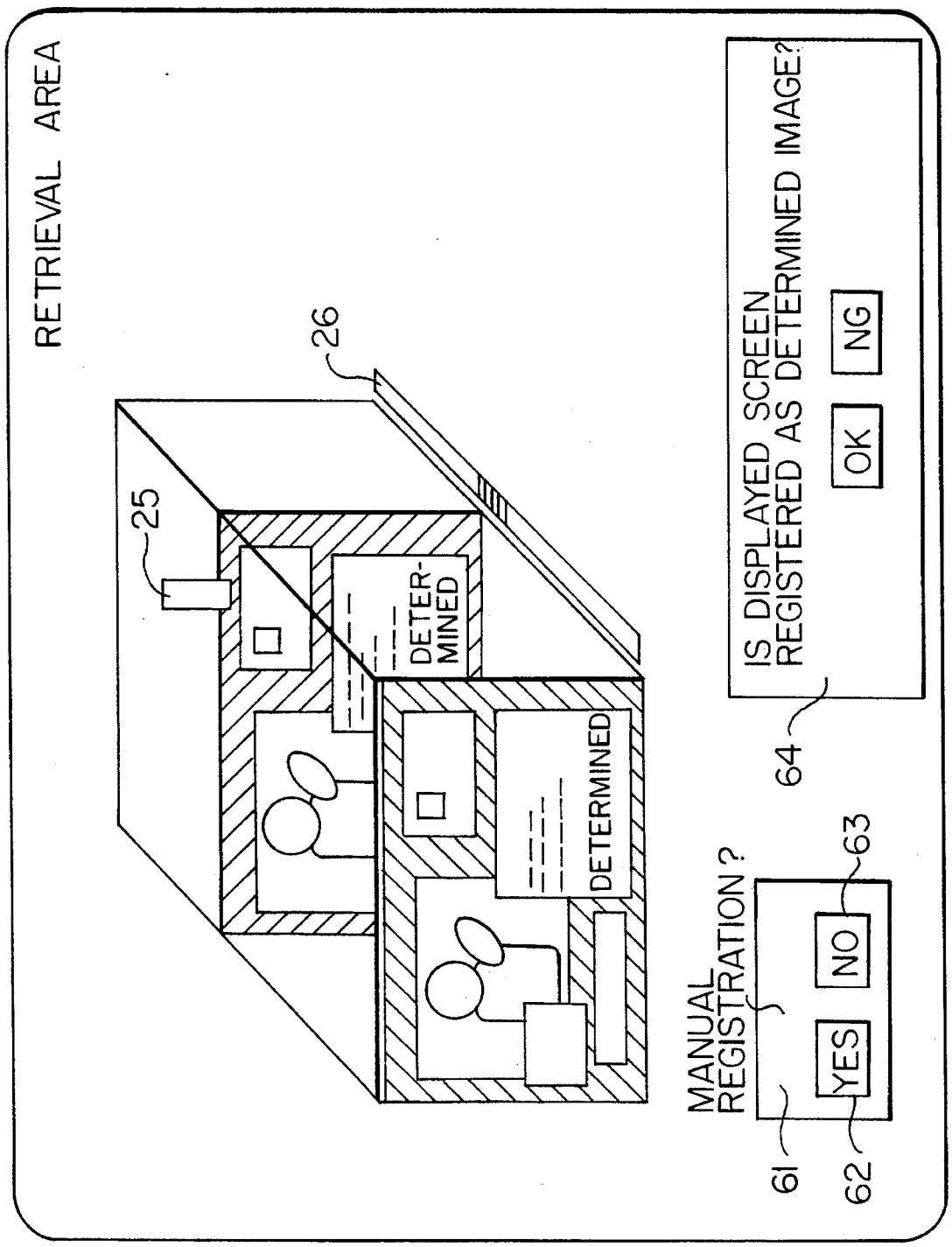
FIG. 17 is an illustration showing the registration of a retrieval marker using an interactive technique.

FIG. 17 shows a modification of the embodiments shown in FIGS. 13(A)–(B) and 16(A)–(B). The embodiment of FIG. 17 displays an environment for making it possible to attach a tag to an important matter, or to change tags by interactive operations. That is, when a tag indicating a determination of a course of action is not attached during a conference, or when an important item with a significance near that of a determination includes contents considered to be essential for preparation of the digest of the conference, the embodiment illustrated in FIG. 17 makes it possible to conversationally attach a tag to an image obtained through retrieval.

To realize the above operation, the embodiment of FIG. 17 has an operation area 61 for providing a tag in the image volume display area. When instructing the system to generate a tag indicating an important matter with the operation designation buttons 62 and 63, the embodiment preferably displays a message for confirming the instruction in an interactive-operation button box 64, and requests confirmation of the marker registration. When the intention for marker registration is confirmed, the embodiment generates a marker indicating that the image is an important matter, and stores the image in a retrieving file. In subsequent operations, the pictured embodiment supports the preparation of a conference report by notifying a user of conference data provided with the important-matter marker by means of a tag metaphor or the like.

Figure 18A:
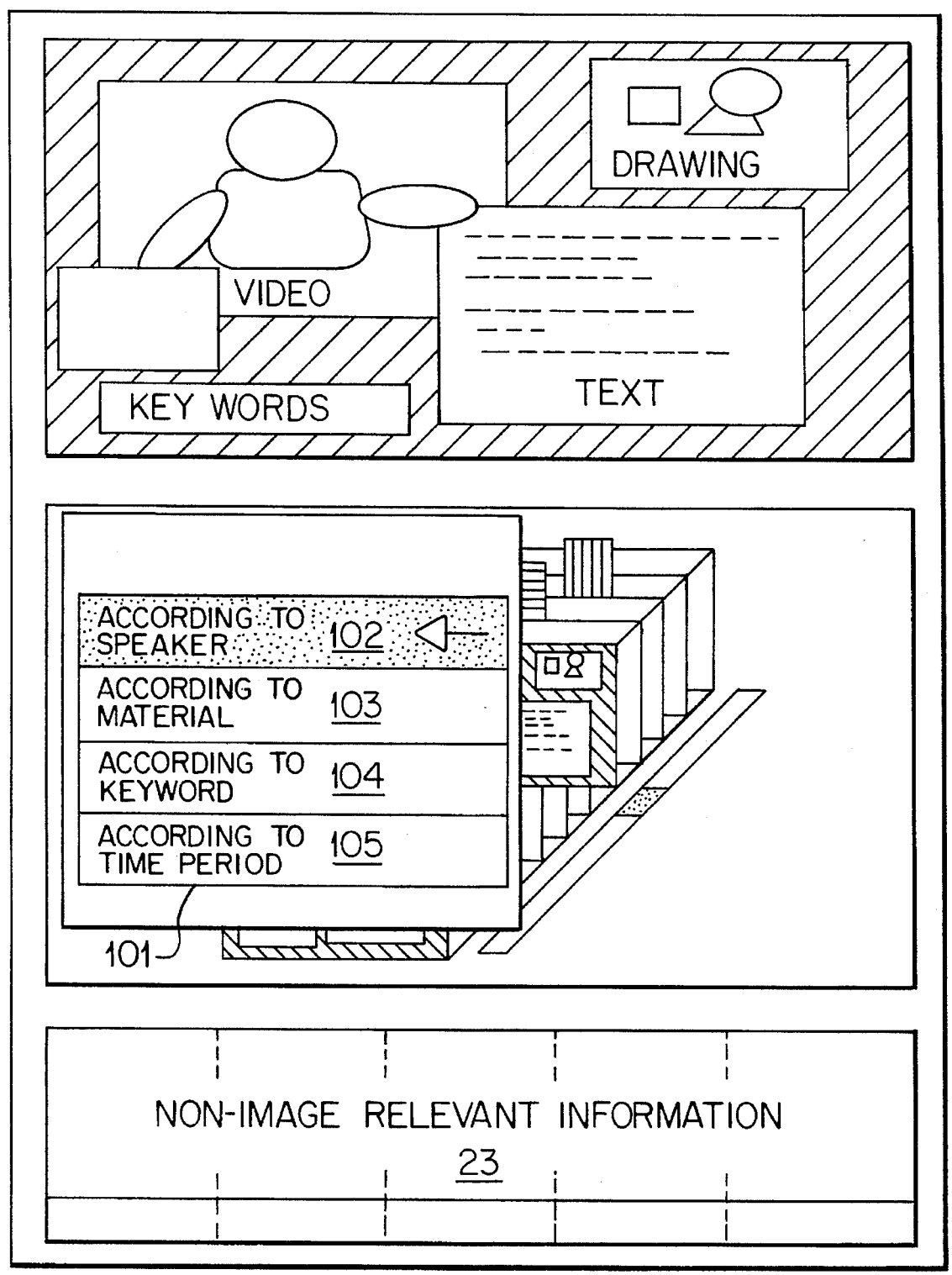
FIGS. 18(A)–18(G) are illustrations showing a retrieval operation when a speaker is used as a key.

A retrieval procedure will be described below by referring to the drawings schematically showing an image display in a retrieval area. FIGS. 18(A)–18(G) show the operation procedure when selecting a speaker as a retrieval condition. The screen illustrated in FIG. 18(A) shows a retrieval menu. That is, by specifying retrieval through a mouse or keyboard when preparing a conference report, a menu 101 for retrieval mode selection appears in the retrieval area. The menu 101 comprises an area 102 for specifying retrieval according to a speaker, an area 103 for specifying retrieval according to a reference material, an area 104 for specifying retrieval according to a keyword, and an area 105 for specifying retrieval according to a time period, any one of which may be selected.

Figure 18B:
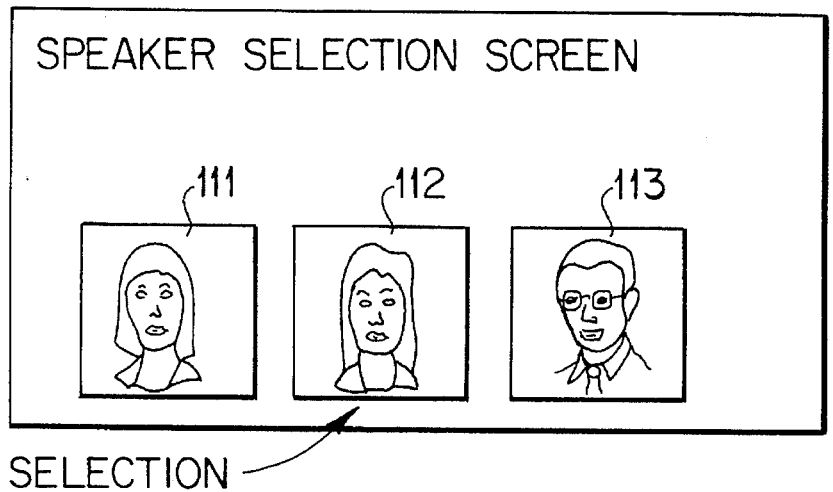

Assuming that a retrieval 102 (according to speaker) is selected, the conference participants are displayed as shown in FIG. 18(B) instead of the retrieval mode selection menu 101. In this embodiment, the face images of conference participants 111, 112, 113 are displayed so that they can be visually identified. Of course, it is possible to display the participants by text information such as their names.

By way of example, when a speaker 112 to be retrieved is selected, a retrieving file is accessed in accordance with the retrieval condition, and the accessed information in the data storing section is obtained. That is, in the event list shown in FIG. 9, the time when the speaker 112 makes a speech is obtained by retrieving the speaker 112 in the "Referrer" column and "voice" in the "Type of Medium" column. Then, data are read from the data storing section in accordance with the retrieval result to store the relevant data in the data cache, and image data are displayed in the form of an image volume as shown in FIG. 18(C).

Moreover, a speaker monitor 121 of conference participants and a conference significance monitor 122 are also displayed simultaneously with the display of the image volume, in a preferred embodiment of the invention. The speaker monitor displays the time period in which the speaker specified through the keyboard has spoken during a conference by obtaining the speaker registered in the retrieving file and the above retrieval result.

The conference significance monitor displays the significance list illustrated in FIG. 11 in time series. That is, information such as the retrieval keyword appearance frequency, the speeches and speaking frequencies of the important conference participants, contents written in materials, and the writing frequencies are analyzed, and each item is weighted to be used as an evaluation criterion showing the significance of the conference. The evaluation criterion does not exactly show the significance of the conference, but it is expected that the criterion is adequate for use as a reference for the user in browsing for the preparation of a conference report.

Figure 18C:
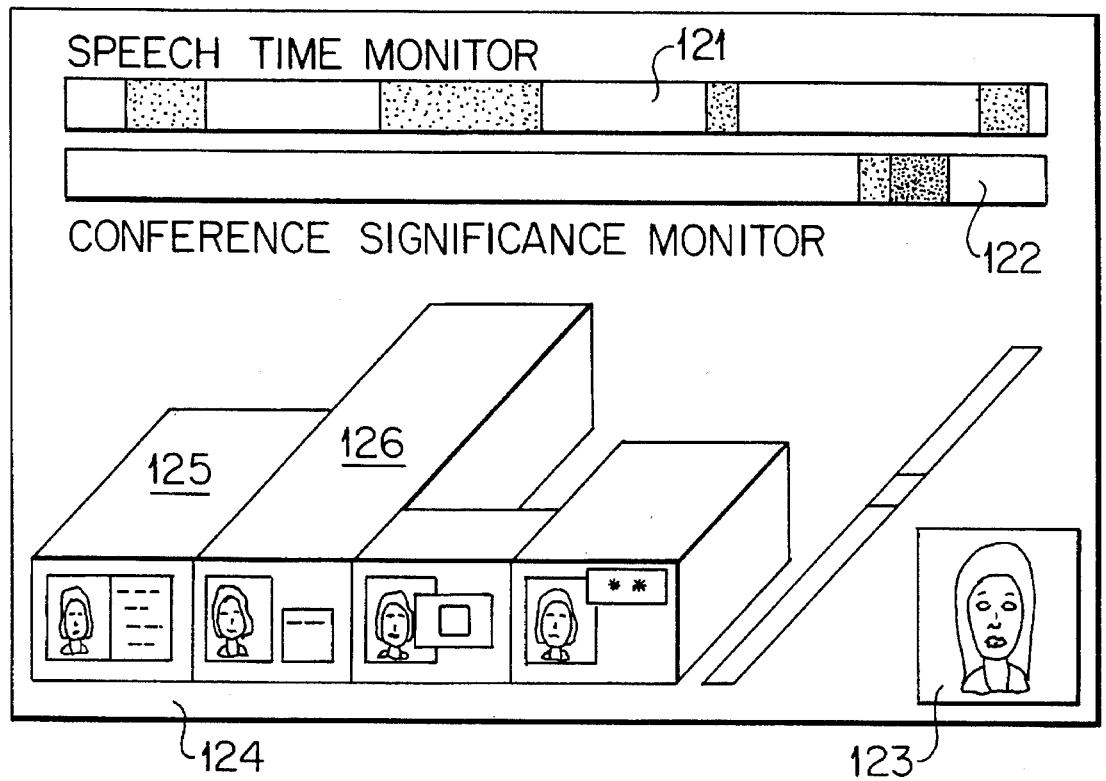

In the retrieval screen of FIG. 18(C), a non-image relevant information display area 124 displays information other than a face image retrieval key 123, as well as images which cannot be displayed by an image volume. The relevant information area is provided in the vicinity of the image volume. It is preferable to display such conference-related information as the discussion participants, referred-material numbers, keywords included in the speeches, and most-frequent speaker, in the form of icon-like small images and text. The embodiment of FIG. 18(C) illustratively shows a retrieval according to speaker, in which image volumes are displayed at different portions in accordance with simultaneously-referred materials. That is, the displayed image volumes comprise an image volume 125 selected by a logical combination of a speaker with a material 1, and an image volume 126 selected by a logical combination of a speaker with a material 2.

Generally, retrieval is performed with a composite key. However, as shown in FIG. 18(C), it is possible to create an environment in which the user can more easily perform retrieval by displaying each retrieval key, and by displaying volumetrically an image related to the key.

Figures 18D, 18E:
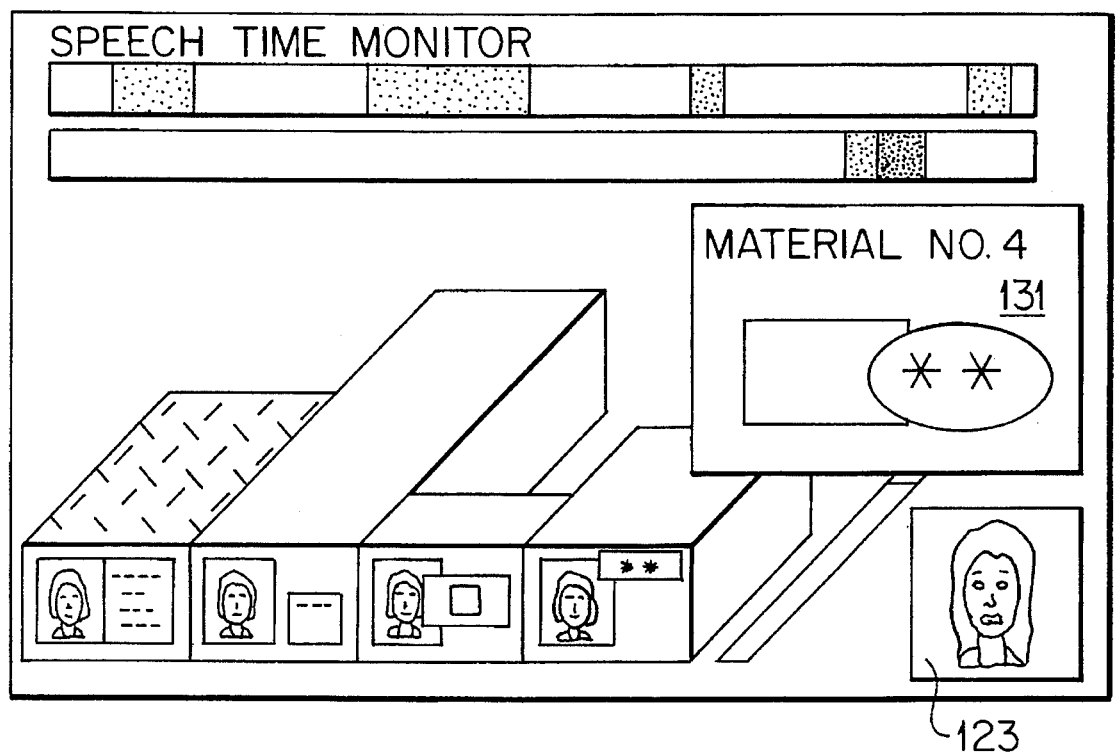

FIG. 18(D) shows an example of displaying a non-image relevant information display area in the above cases. That is, in the non-image relevant information display area, the discussion participants, referred materials, list of keywords, and most-frequent speaker in a selected scene are displayed.

A multistage retrieving method using image volumes and relevant information will be described next. In general, for material retrieval, a multistage retrieval comprises a primary retrieval and a secondary retrieval, in which only required information is obtained by screening the primary retrieval result. Also, in the case of retrieval for the preparation of a conference report, required materials can more clearly be displayed by screening the retrieval result at the first stage shown in FIG. 18(C) with new retrieval keywords.

Figure 18F:
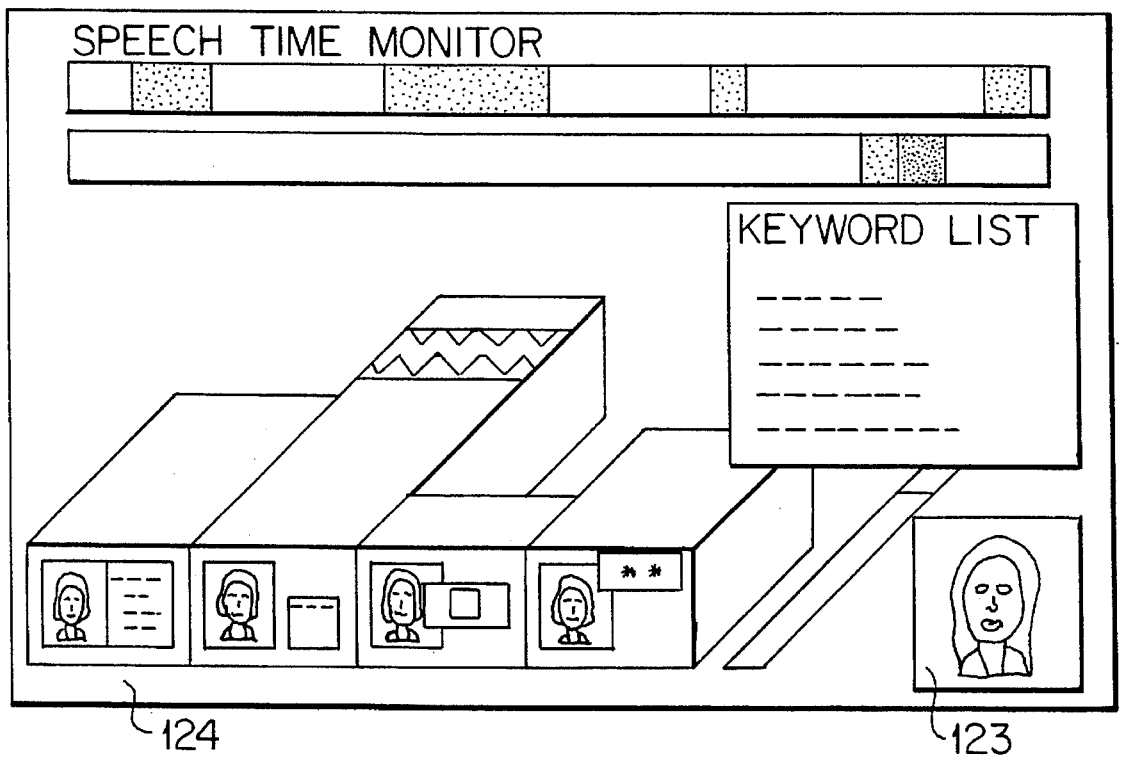
Figure 18G:
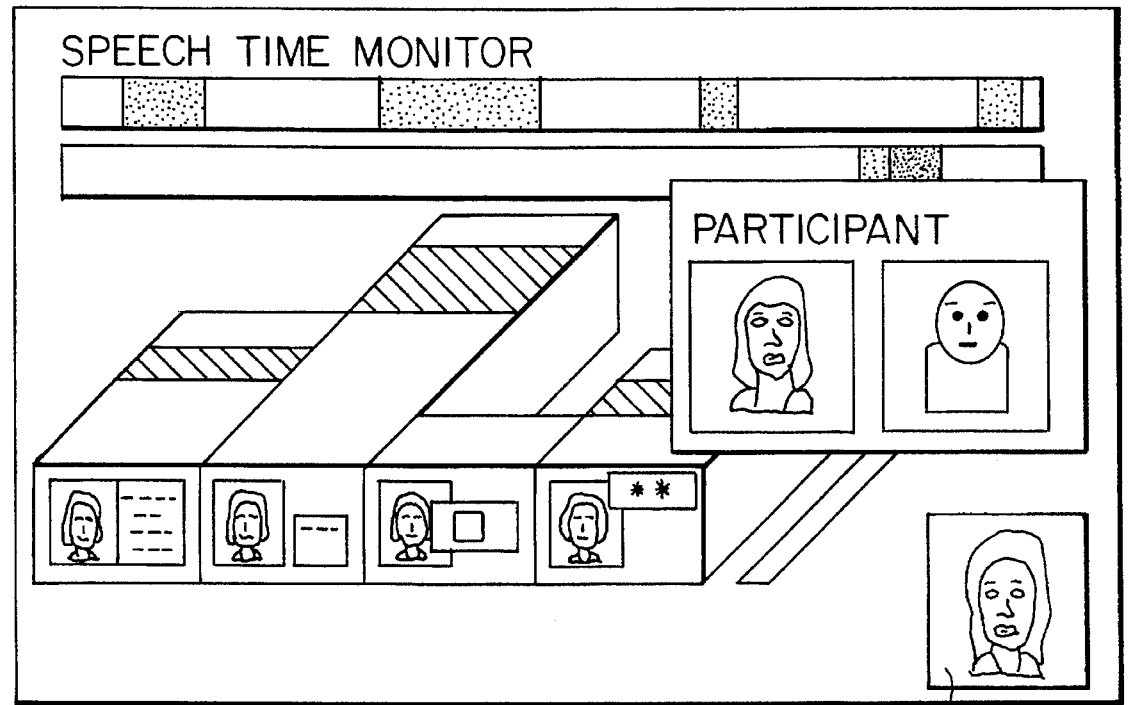
Figure 19A:
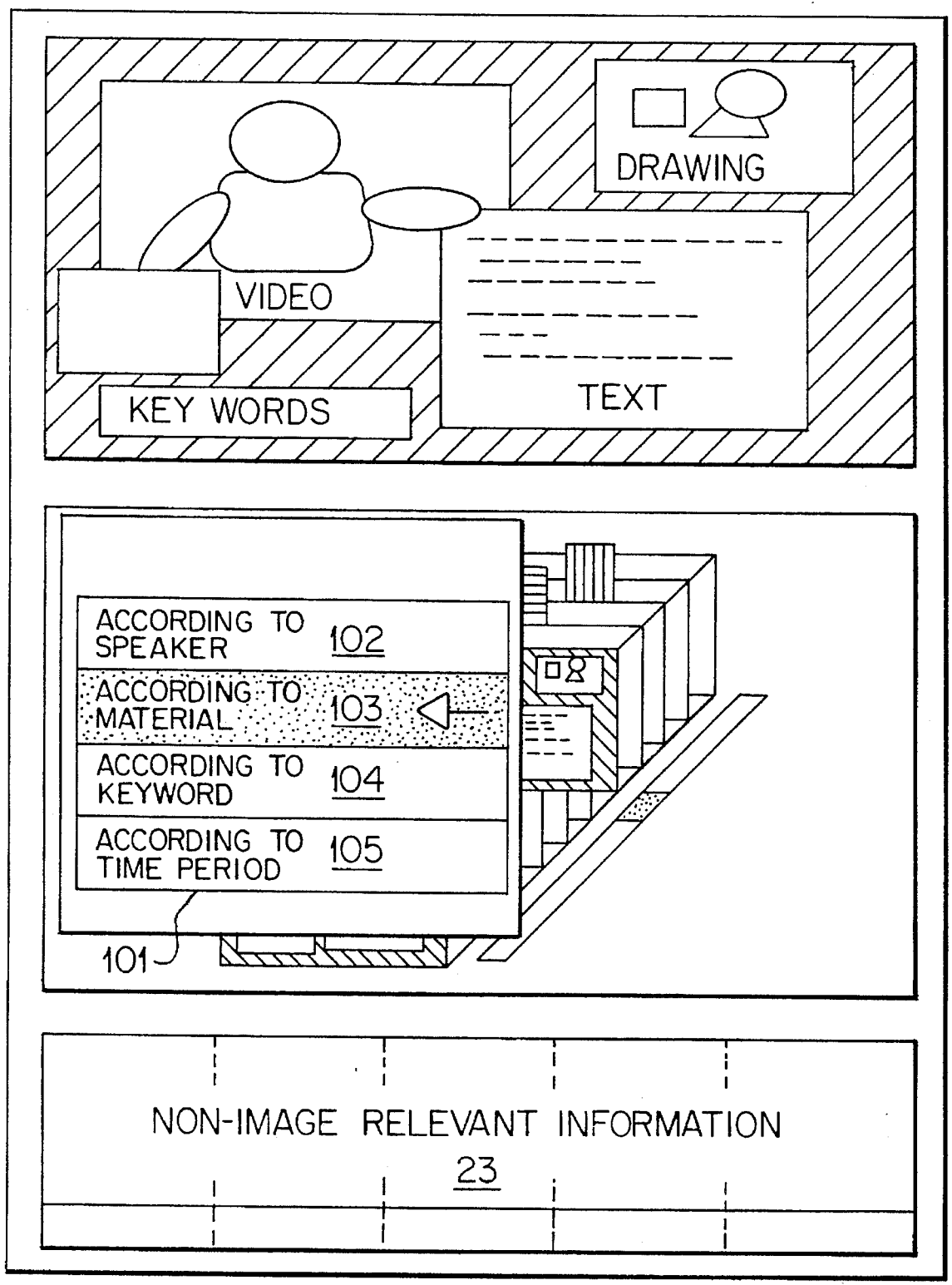
FIGS. 19(A)–19(G) are illustrations showing a retrieval operation when a conference material is used as a key.
Figures 19B, 19C:
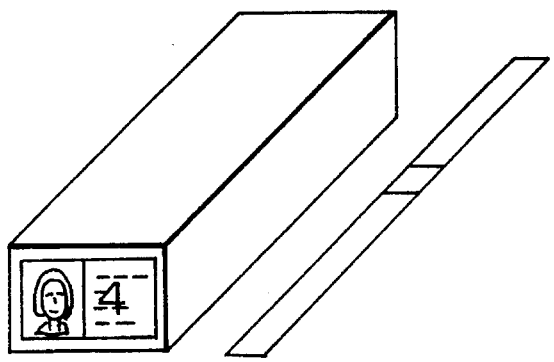
Figures 19D, 19E:
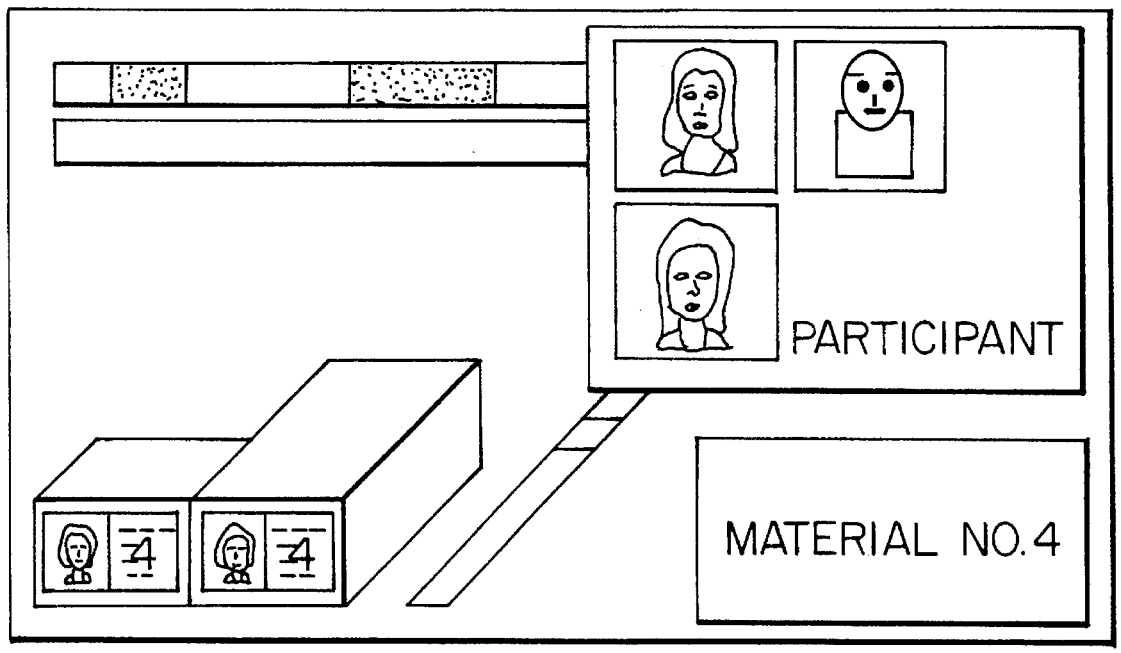
Figure 19F:
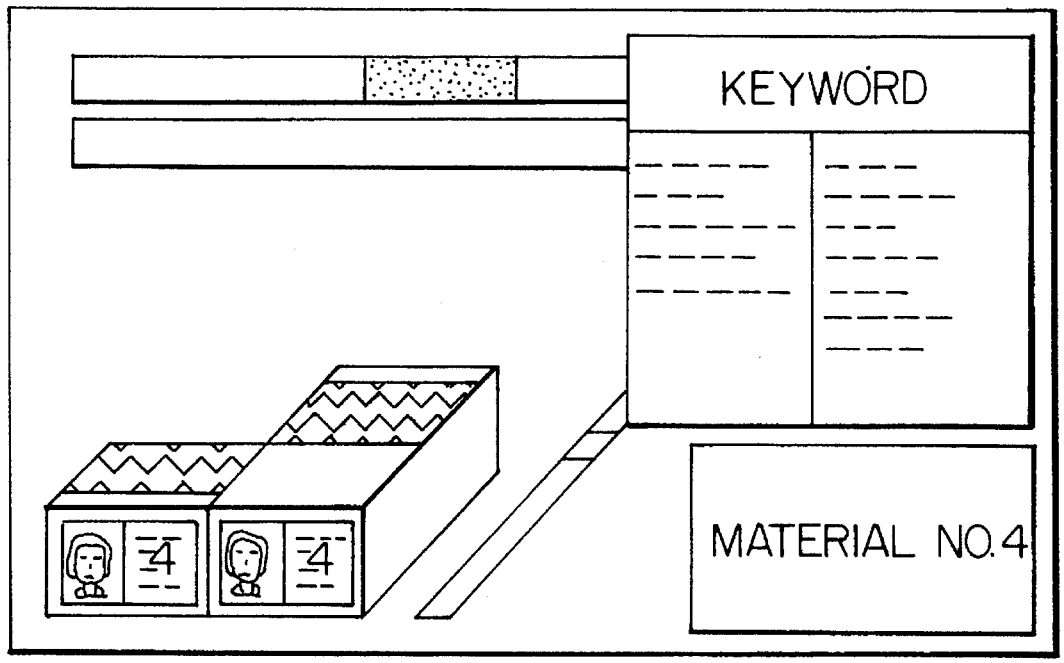
Figure 19G:
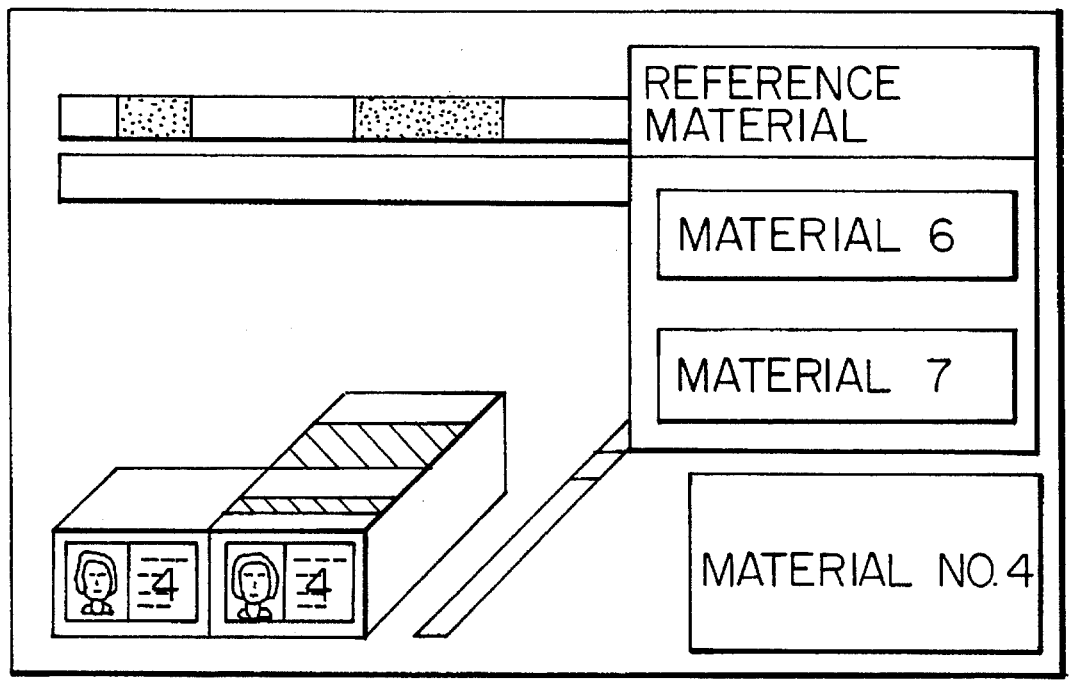
Figure 20A:
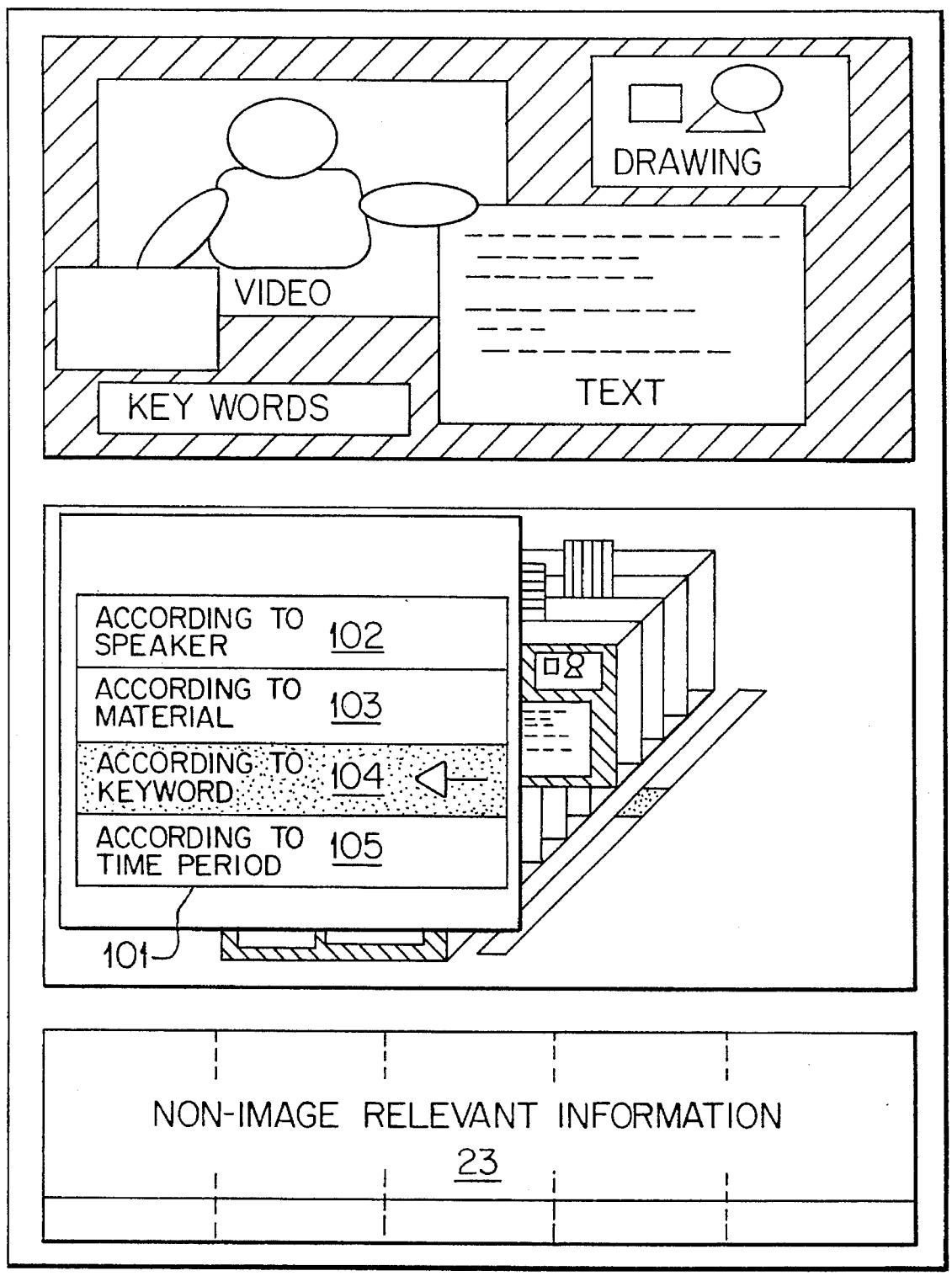
FIGS. 20(A)–20(F) are illustrations showing a retrieval operation when a keyword is used as a key.
Figures 20B, 20C, 20D:
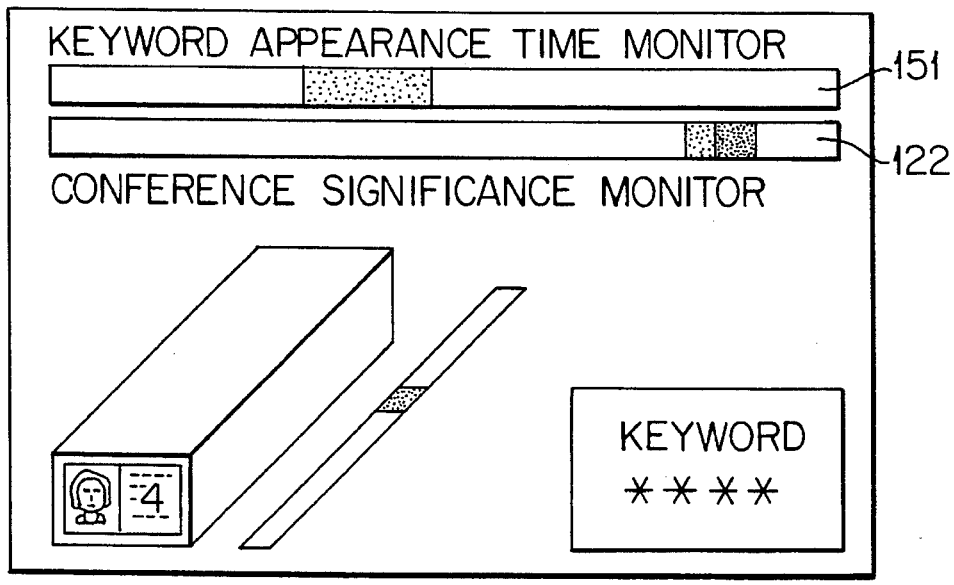
Figure 20E:
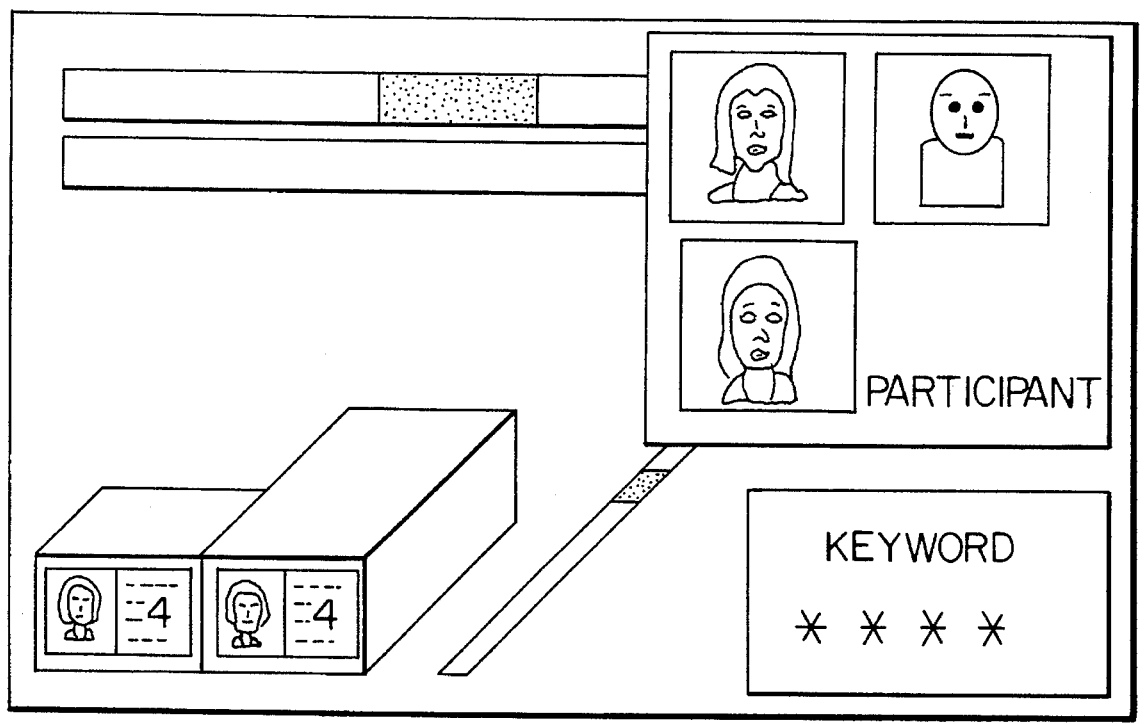
Figure 20F:
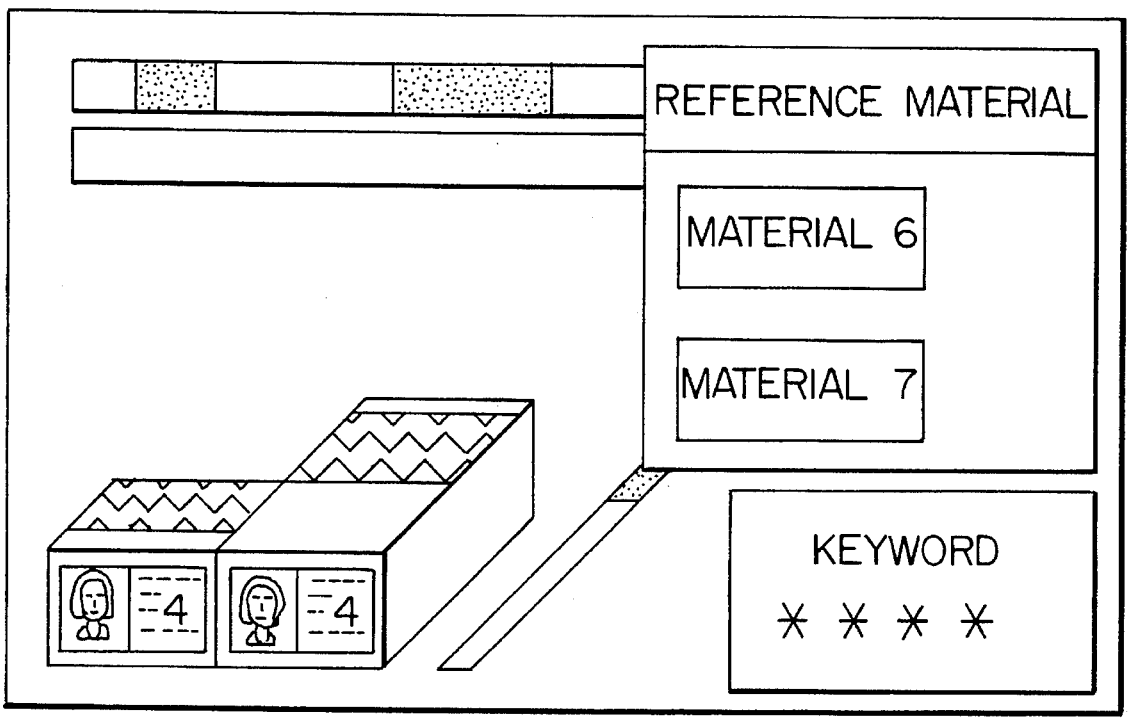

To realize the objectives of this embodiment, it is preferable to obtain the retrieval result at the first stage again by using the keywords of the non-image relevant information area. Thus, when a conference material number is specified in the non-image relevant information area, the retrieval condition of this example is the logical AND of a speaker and a material number. The retrieval result in this case is shown in FIG. 18(E). That is, the material specified as a retrieval condition is displayed in another window 131 in the retrieval area and an area including an image satisfying the above retrieval condition is changed in brightness, color or other visual attribute so that the user can more easily recognize the material. Moreover, by selecting the "Keyword" column in the non-image relevant information area, a keyword list is displayed separately from the non-image relevant information area as shown in FIG. 18(F). Then, by selecting a keyword used for retrieval in the list, composite retrieval can be performed. It is also possible to enable the user to recognize the result of the composite retrieval by changing the brightness, color or other visual attribute of the top of the image volume meeting the conditions of the above retrieval according to a specified material. FIG. 18(G) shows a further example of image display when a composite retrieval is performed according to a selected participant.

FIGS. 19(A)–19(G) and 20(A)–20(F) show embodiments in which retrieval is performed by changing the retrieval keys of FIG. 18. The embodiment of FIGS. 19(A)–19(G) is different from that of FIGS. 18(A)–18(G) in that the first retrieval condition is a material image in FIGS. 19(A)–19(G). That is, an image volume related to the material No. 4 is displayed in the first-stage retrieval (FIG. 19(C)). In the second-stage retrieval, composite retrieval by ANDing a reference material with a participant, a keyword, or a reference material and another reference material 6 is realized. The embodiment of FIGS. 20(A)–20(F) is different from that of FIG. 18 in that the first retrieval condition is a keyword in FIGS. 20(A)–20(F).

The embodiment of FIGS. 19(A)–19(G) similarly provides a user interface for realizing multistage composite retrieval. The user interface is obtained by quickly retrieving conference material data and images desired by the conference report preparer. In the embodiment of FIGS. 19(A)–19(G), a material utilization monitor 141 is displayed instead of the speaker monitor 121. In the embodiment of FIGS. 20(A)–20(F), a keyword appearance monitor 151 is displayed. The material utilization monitor 141 shows the time when a conference material is shown. The keyword appearance monitor 151 shows the time period when a keyword appears during the conference. These monitors can be generated by using the materials and their time stamps registered in the retrieving file, and a keyword and its time stamp indicating when the keyword appears.

Figure 21:
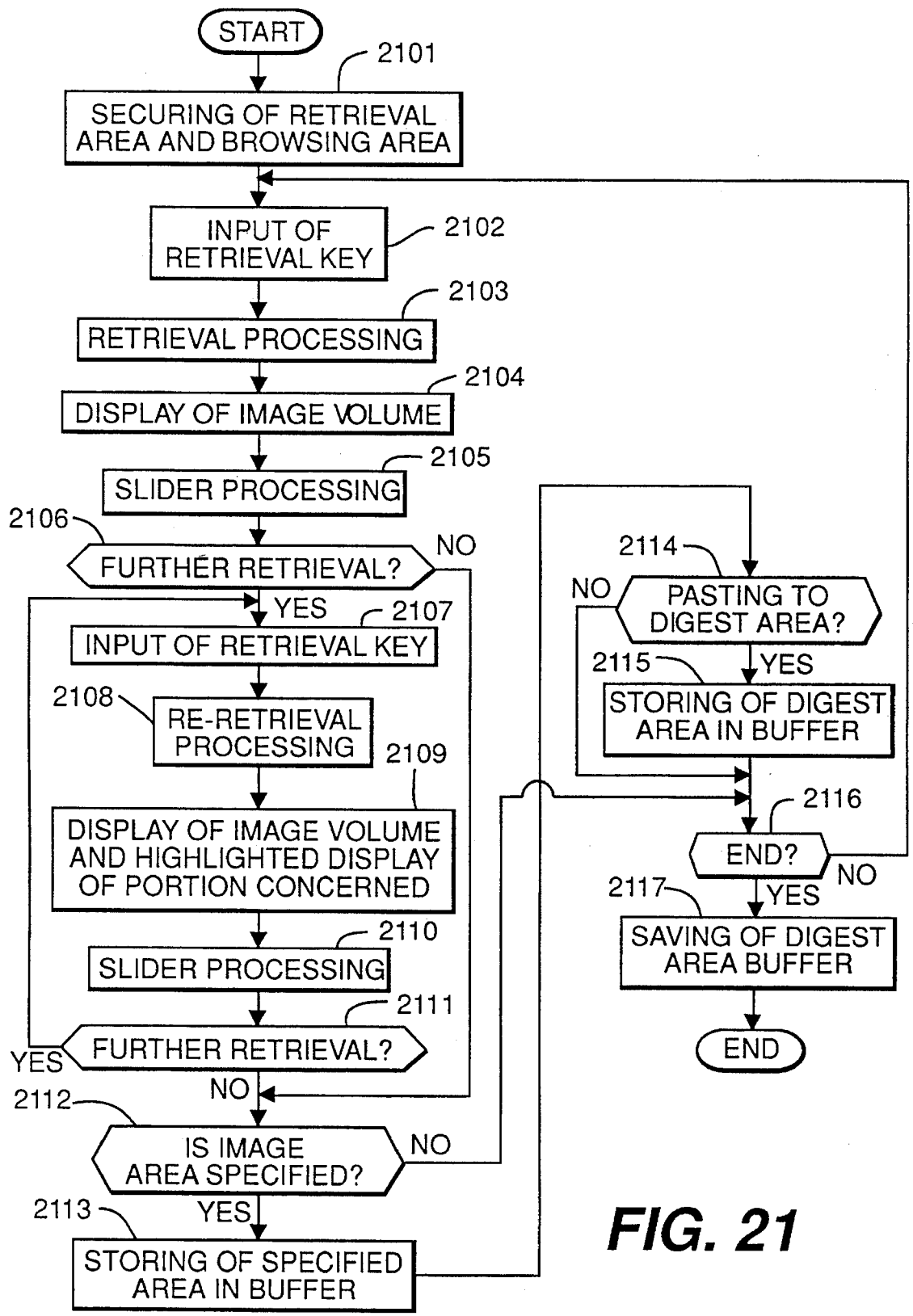
FIG. 21 is a flow chart showing a conference digest preparation procedure.

The above embodiments have been described by focusing on the method for constituting a screen display. The flow of browsing processing will be described below by referring to the flow chart shown in FIG. 21.

The first steps to be performed after the preparation of a conference report is started is to secure a retrieval area and a browsing area on the display screen of the conference report preparation supporting system (step 2101), whereby retrieval and browsing processing are enabled. Then, retrieval is started and the input of a retrieval key is prompted (step 2102) to obtain conference data desired by the conference report preparer through a terminal. The conference report preparation supporting system accesses the retrieving file in accordance with the input retrieval key to obtain conference data that corresponds to the key (step 2103). Out of the conference data, image-related data are displayed as an image volume and non-image data are displayed as non-image information (step 2104). In this case, various monitors for enhancing the understanding of the progress of a conference are also displayed as images, as described in the previous embodiment.

Then, the conference report preparation supporting system checks to see if the user requests image browsing through slider operation (step 2105). If so, the system displays a specified image area in the enlarged image display area. This flow will be mentioned later. The next step is the judgment of whether multistage retrieval is requested (step 2106). When the data desired by the conference report preparer cannot be obtained from the retrieval at the first stage, retrieval is further executed by adding conditions. When this second-stage retrieval is unnecessary, the loop of the multistage retrieval processing is bypassed.

In the multistage retrieval processing, a key for retrieval is obtained (step 2107) similarly to the previous retrieval processing, and the retrieval file and data file are continuously retrieved to obtain the data conforming with the key (step 2108). Then, an image volume of the retrieved information is displayed, with appropriate highlighting or marking as previously described (step 2109). A slider operation request is also checked as in the previous case (step 2110).

If there is no further retrieval, the flow proceeds to analysis of the imaged information; otherwise, the flow returns to step 2107 (step 2111). It is preferable to form this loop structure so that the multistage retrieval can be repeated as long as retrieval is requested.

When the multistage retrieval terminates and the conference report data desired by the conference report preparer are obtained in steps 2108–2111, the system checks to see if the data are selected to be used in a conference digest. Unless the image data to be used are specified (step 2112), the processing jumps to termination judgment (step 2116), assuming that the retrieval result is incomplete or preparation for a digest is not necessary. When the data to be used are specified, the contents of the retrieving file and conference report data are stored (copied) in a buffer (step 2113).

Then, the system checks whether the operation instruction is a request to paste the data to the digest area (step 2114). If so, the copied buffer contents are pasted to a buffer for holding data stored in the digest area (step 2115). By this cutting and pasting, a conference digest can be prepared from the conference data retrieved in the retrieval area using any of the disclosed input procedures.

When pasting to the digest area is finished, it is checked whether the operation is to be terminated (step 2116). When a termination request is detected, the buffer contents generated as a digest by that time are saved in a permanent recording medium as a conference report, and the process is terminated (step 2117). When a termination request is not detected, the process returns to step 2102 (retrieval processing).

In the description of the flow chart, the position to which the flow returns is assumed as the processing for the input request of the front retrieval key for simplicity of description. When the step returns, however, it is possible to request the conference report preparer to input an instruction to return to a different step. Because the retrieval can be resumed while using the same retrieval condition by so returning, the procedure in which the return position can be specified by the user enables more effective and user-friendly retrieval and browsing.

Although many embodiments of the invention have been described, various modifications of the specifically disclosed embodiments will become apparent to those of ordinary skill in the art of concern. All such modifications that basically rely upon the teachings through which the invention has advanced the state of the art are properly considered to be within the spirit and scope of the invention.

We claim:

1. A multimedia summary preparation supporting system, comprising:

data input means for inputting summary data;

data storing means for holding the summary data input by said data input means;

data registering means for storing the summary data input by the data input means into the data storing means, analyzing times of occurrence of events represented in the summary data, and generating a retrieving file containing information indicating summary data that meet a specified retrieval condition;

retrieving file storing means for storing the retrieving file generated by the data registering means; and summary preparation supporting means for supporting the preparation of a summary by reading the summary data from the data storing means by reference to the retrieving file stored in the retrieving file storing means, for displaying the summary data, and for editing the summary data;

wherein the summary preparation supporting means simultaneously displays a retrieval and browsing area and a digest area.

2. A multimedia summary preparation supporting system according to claim 1, wherein the summary data are data of a conference.

3. A multimedia summary preparation supporting system according to claim 1, wherein the summary preparation supporting means displays, in the retrieval and browsing area, an enlarged image display area, an image volume display area having a plurality of image frames displayed simultaneously and chronologically, and a non-image information area.

4. The multimedia summary preparation supporting system according to claim 3, wherein the summary preparation supporting means includes means for specifying an image frame displayed in the image volume display area.

5. The multimedia summary preparation supporting system according to claim 4, wherein the summary preparation supporting means displays a specified image frame at the forefront of the group of image frames constituting the image volume display area.

6. The multimedia summary preparation supporting system according to claim 5, further comprising means for selecting one of an image displaying function for displaying specified image frames at the forefront of the group of image frames arranged in time series and a function for arranging and displaying the specified image frames in time series in the image volume display area.

7. The multimedia summary preparation supporting system according to claim 1, wherein the summary preparation supporting means displays, in the digest area, items showing name, date, place, and participants of a conference to be summarized, matters determined for resolution, suspended matters, and a schedule for a succeeding conference.

8. The multimedia summary preparation supporting system according to claim 7, wherein the digest area has at least one relevant information displaying area.

9. The multimedia summary preparation supporting system according to claim 1, wherein the summary preparation supporting means includes buffer means for buffering data to be displayed in the retrieval and browsing area, data recording means for storing data to be displayed in the digest area, and means for inserting the data stored in the buffer means into any position of the data recording means.

10. A multimedia summary preparation supporting system, comprising:

data input means for inputting summary data;

data storing means for holding the summary data input by said data input means;

data registering means for storing the summary data input by the data input means into the data storing means, analyzing times of occurrence of events represented in the summary data, and generating a retrieving file containing information indicating summary data that meet a specified retrieval condition;

retrieving file storing means for storing the retrieving file generated by the data registering means; and summary preparation supporting means for supporting the preparation of a summary by reading the summary data from the data storing means by reference to the retrieving file stored in the retrieving file storing means, for displaying the summary data, and for editing the summary data;

wherein the data registering means comprises:
a retrieving file generating section for generating the retrieving file by analyzing the summary data for markers that indicate summary data to be included in the summary; and
a data distributing section for registering the summary data in the data storing means and distributing the summary data to the retrieving file generating section.

11. A multimedia summary preparation supporting system, comprising:

data input means for inputting summary data;

data storing means for holding the summary data input by said data input means;

data registering means for storing the summary data input by the data input means into the data storing means, analyzing times of occurrence of events represented in the summary data, and generating a retrieving file containing information indicating summary data that meet a specified retrieval condition;

retrieving file storing means for storing the retrieving file generated by the data registering means; and summary preparation supporting means for supporting the preparation of a summary by reading the summary data from the data storing means by reference to the retrieving file stored in the retrieving file storing means, for displaying the summary data, and for editing the summary data;

wherein the data registering means:
identifies a referrer from the identification number of the data input means and that of a keyboarding means having designated the reference of materials when the materials are referred to;
identifies a speaker from the identification number of a voice inputting means and through the extraction of features of the voice when a speech is made;
identifies a handwriting person from the identification number of a handwritten character inputting unit and through the extraction of features of the characters when hand-written characters are displayed;
identifies a referrer based on the identification number of the keyboarding means in which inputted data has instructed the input of a text data text; and
generates a retrieving file in which the start and end times of events obtained by the data registering means are registered and supports the extraction of a scene desired by a conference summary preparer by using the retrieving file when the conference summary is prepared.

12. A multimedia summary preparation supporting system, comprising:

data input means for inputting summary data;

data storing means for holding the summary data input by said data input means;

data registering means for storing the summary data input by the data input means into the data storing means, analyzing times of occurrence of events represented in the summary data, and generating a retrieving file containing information indicating summary data that meet a specified retrieval condition;

retrieving file storing means for storing the retrieving file generated by the data registering means; and summary preparation supporting means for supporting the preparation of a summary by reading the summary data from the data storing means by reference to the retrieving file stored in the retrieving file storing means, for displaying the summary data, and for editing the summary data;

wherein the data registering means generates a retrieving file including start and end times of at least one of reference materials, speech acts, display of handwritten characters, and display of texts of a conference, and supports the extraction of a scene desired by a conference summary preparer by using the retrieving file when the conference summary is prepared.

13. A multimedia summary preparation supporting system, comprising:

data input means for inputting summary data;

data storing means for holding the summary data input by said data input means;

data registering means for storing the summary data input by the data input means into the data storing means, analyzing times of occurrence of events represented in the summary data, and generating a retrieving file containing information indicating summary data that meet a specified retrieval condition;

retrieving file storing means for storing the retrieving file generated by the data registering means; and summary preparation supporting means for supporting the preparation of a summary by reading the summary data from the data storing means by reference to the retrieving file stored in the retrieving file storing means, for displaying the summary data, and for editing the summary data;

wherein the summary preparation supporting means:

extracts a keyword through the processing of image recognition when the data inputted from the data input means is image data and identifies a referrer from an identification number of the data input means and that of a keyboarding means designating an image display;

extracts a keyword through the processing of voice recognition when data inputted from the data input means are voice data and identifies a speaker from the identification number of the data input means and through the extraction of features of the voice;

extracts a keyword through the processing of character recognition when the data inputted from the data input means is inputted handwritten characters and identifies the handwriting person from the identification number of a handwritten character input unit and through the extraction of features of the characters;

extracts a keyword through the processing of morpheme analysis when the data inputted from the data input means are text data and identifies a referrer from the identification number of the keyboarding means having designated the input of a text;

extracts a keyword corresponding to an item specified through the designation by a conference participant when the input data is the identification information corresponding to the item and identifies a person who has input the identification information from the identification number of a unit by which the identification information is inputted; and generates a retrieving file storing the retrieval keyword, the referrer and the time when the retrieval keyword appears and supports the extraction of a scene desired by a conference summary preparer by using the retrieving file when the conference summary is prepared.

14. A multimedia summary preparation supporting system, comprising:

data input means for inputting summary data;

data storing means for holding the summary data input by said data input means;

data registering means for storing the summary data input by the data input means into the data storing means, analyzing times of occurrence of events represented in the summary data, and generating a retrieving file containing information indicating summary data that meet a specified retrieval condition;

retrieving file storing means for storing the retrieving file generated by the data registering means; and summary preparation supporting means for supporting the preparation of a summary by reading the summary data from the data storing means by reference to the retrieving file stored in the retrieving file storing means, for displaying the summary data, and for editing the summary data;

wherein the data registering means registers identification information for an item specified by an operation instruction of a conference participant of a conference to be summarized in a retrieving file while the conference is progressing in order to prepare the conference summary on name, place, date, and participants of the conference, matters determined for resolution, suspended matters, a schedule of a succeeding conference, and subjects to be discussed at the succeeding conference, and supports the extraction of a scene desired by the conference summary preparer by using the identification information when the conference summary is prepared.

15. The multimedia summary preparation supporting system according to claim 14, further comprising read controlling means for accessing data storing means having a retrieving file to which the summary preparation supporting means previously refers for identification information and automatically reads the items specified through designation by a conference participant for storage in conference summary preparing means in order to prepare a conference summary including name, place, date, and participants of a conference, matters determined for resolution, suspended matters, a schedule for a succeeding conference, and subjects to be discussed at the succeeding conference.

16. A multimedia summary preparation supporting system, comprising:

data input means for inputting summary data;

data storing means for holding the summary data input by said data input means;

data registering means for storing the summary data input by the data input means into the data storing means, analyzing times of occurrence of events represented in the summary data, and generating a retrieving file containing information indicating summary data that meet a specified retrieval condition;

retrieving file storing means for storing the retrieving file generated by the data registering means; and summary preparation supporting means for supporting the preparation of a summary by reading the summary data from the data storing means by reference to the retrieving file stored in the retrieving file storing means, for displaying the summary data, and for editing the summary data;

wherein the summary preparation supporting means automatically extracts a keyword for retrieval by at least one of an image recognizing means, voice recognizing means, character recognizing means, and text processing means, each of which recognizes the data inputted by the data input means, generating the retrieving file storing the time when the keyword for retrieval appears, and supporting the extraction of a scene desired by a summary preparer by using the retrieving file when preparing a summary.

17. A multimedia summary preparation supporting system according to claim 16, wherein the data registering means generates a retrieving file having information showing priorities of conferences in time series in accordance with at least one of weighted information with respect to an extracted keyword, weighted information with respect to a speaker of the keyword, information about utterance frequency, information about keyword appearance frequency, and information about frequency of input by handwritten character inputting means, and supports the extraction of a scene desired by the conference summary preparer by using the retrieving file when the conference summary is prepared.

18. A multimedia summary preparation supporting system according to claim 16, wherein the data registering means automatically extracts items of a conference summary such as name, place, date, and participants of a conference, matters determined for resolution, suspended matters, schedule of a succeeding conference, and subjects to be discussed at the succeeding conference in accordance with a weighting of information by an extracted keyword, information about keyword appearance frequency, and information by a speaker of the keyword; generates a retrieving file in which an item concerned is provided with identification information, and supports the extraction of a scene desired by the conference summary preparer by using the identification information when the conference summary is prepared.

19. The multimedia summary preparation supporting system according to claim 18, further comprising read controlling means for accessing data storing means having a retrieving file to which the summary preparation supporting means previously refers for the identification information and automatically reads name, place, date, and participants of a conference, matters determined for resolution, suspended matters, a schedule of a succeeding conference, and subjects to be discussed at the succeeding conference, and stores the automatically read information in conference summary preparing means.

20. A multimedia summary preparation supporting system, comprising:

data input means for inputting summary data;

data storing means for holding the summary data input by said data input means;

data registering means for storing the summary data input by the data input means into the data storing means, analyzing times of occurrence of events represented in the summary data, and generating a retrieving file containing information indicating summary data that meet a specified retrieval condition;

retrieving file storing means for storing the retrieving file generated by the data registering means; and summary preparation supporting means for supporting the preparation of a summary by reading the summary data from the data storing means by reference to the retrieving file stored in the retrieving file storing means, for displaying the summary data, and for editing the summary data;

wherein the data registering means includes:

a retrieval controlling section for retrieving summary data meeting a specified retrieval condition by referring to the retrieving file stored in the retrieving file storing means;

a read controlling section for reading the summary data from the data storing means in accordance with the retrieval result obtained by the retrieval controlling section;

a data cache for buffering the data read from the data storing means;

a browsing controlling section for browsing the details of a conference in accordance with the data stored in the data cache; and a conference summary preparation supporting section for supporting the preparation for a digest version of a conference summary in accordance with the contents browsed by the browsing controlling section.

* * * * *